US011093776B2

(12) United States Patent
Jung et al.

(10) Patent No.: US 11,093,776 B2
(45) Date of Patent: Aug. 17, 2021

(54) METHOD AND APPARATUS FOR PROCESSING DISTORTION OF FINGERPRINT IMAGE

(71) Applicant: Samsung Electronics Co., Ltd., Suwon-si (KR)

(72) Inventors: Yu-Min Jung, Suwon-si (KR); Hae-Dong Lee, Daegu (KR); Seong-Sig Kang, Gwangmyeong-si (KR); Kyu-Hong Kim, Seoul (KR); Hee-Kuk Lee, Suwon-si (KR); Tushar Balasaheb Sandhan, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/473,899

(22) PCT Filed: Jan. 4, 2018

(86) PCT No.: PCT/KR2018/000192
§ 371 (c)(1),
(2) Date: Jun. 26, 2019

(87) PCT Pub. No.: WO2018/128422
PCT Pub. Date: Jul. 12, 2018

(65) Prior Publication Data
US 2019/0340455 A1    Nov. 7, 2019

(30) Foreign Application Priority Data

Jan. 6, 2017 (KR) .................. 10-2017-0002496

(51) Int. Cl.
*G06K 9/00* (2006.01)
*G06K 9/03* (2006.01)
(Continued)

(52) U.S. Cl.
CPC ......... *G06K 9/036* (2013.01); *G06K 9/00013* (2013.01); *G06K 9/00067* (2013.01);
(Continued)

(58) Field of Classification Search
CPC .... G06K 9/0004; G06K 9/00013; G06K 7/14; G06K 9/0002; G06K 9/001;
(Continued)

(56) References Cited

U.S. PATENT DOCUMENTS 6,125,192 A * 9/2000 Bjorn ............... G06Q 20/40145
382/124
6,535,622 B1 * 3/2003 Russo ............... G06K 9/00013
340/5.83
(Continued)

FOREIGN PATENT DOCUMENTS

KR    10-2010-0100459 A    9/2010
KR    10-2013-0024501 A    3/2013
(Continued)

*Primary Examiner* — Yuzhen Shen
(74) *Attorney, Agent, or Firm* — Jefferson IP Law, LLP

(57) ABSTRACT

The present invention relates to a method and an apparatus for processing a distortion of a fingerprint image. An electronic device according to various embodiments of the present invention comprises: a housing; a transparent member which forms at least a part of an outer surface of the electronic device and is arranged in at least a part of the housing; a display (160) of which at least a part is accommodated in the housing and which is arranged in at least a partial area of the transparent member; a fingerprint sensor formed in at least a partial area of the display; and a processor connected with the display and the fingerprint sensor, wherein the processor can be configured to confirm status information related to contamination of at least a partial area, of the transparent member, corresponding to the fingerprint sensor, by using the fingerprint sensor, to acquire bio-information through at least a partial area, of the trans-
(Continued)

parent member, corresponding to the fingerprint sensor, by using the fingerprint sensor, and to recognize the bio-information on the basis of the status information.

9 Claims, 21 Drawing Sheets

(51) Int. Cl.
    *G06K 9/38*       (2006.01)
    *G06K 9/62*       (2006.01)
    *G06T 5/50*       (2006.01)

(52) U.S. Cl.
    CPC ........... *G06K 9/00087* (2013.01); *G06K 9/38* (2013.01); *G06K 9/6261* (2013.01); *G06T 5/50* (2013.01)

(58) Field of Classification Search
    CPC .......... G06K 9/0008; G06F 2203/0338; G06F 2203/04111; G06F 2203/04112
    See application file for complete search history.

(56) References Cited

U.S. PATENT DOCUMENTS

| | | | | |
|---|---|---|---|---|
| 7,012,642 | B1* | 3/2006 | Zell | H04N 5/253 348/246 |
| 8,805,025 | B2* | 8/2014 | Chen | G07D 7/187 382/112 |
| 2004/0156555 | A1 | 8/2004 | Irving et al. | |
| 2004/0208348 | A1* | 10/2004 | Baharav | G06K 9/00026 382/124 |
| 2005/0069179 | A1* | 3/2005 | Hwang | G06K 9/036 382/124 |
| 2007/0223791 | A1* | 9/2007 | Shinzaki | G06K 9/00026 382/124 |
| 2009/0154779 | A1 | 6/2009 | Satyan et al. | |
| 2010/0225607 | A1 | 9/2010 | Kim | |
| 2012/0218444 | A1 | 8/2012 | Stach | |
| 2013/0004031 | A1 | 1/2013 | Abiko | |
| 2015/0199553 | A1 | 7/2015 | Kim et al. | |
| 2016/0063033 | A1 | 3/2016 | Park et al. | |
| 2016/0210407 | A1 | 7/2016 | Hwang et al. | |
| 2016/0306491 | A1 | 10/2016 | Lee et al. | |
| 2017/0220838 | A1* | 8/2017 | He | G06F 3/044 |
| 2017/0351364 | A1* | 12/2017 | Kim | G06K 9/00 |
| 2018/0032788 | A1* | 2/2018 | Krenzer | G06K 9/00006 |
| 2018/0165437 | A1* | 6/2018 | Shim | G06T 7/73 |
| 2019/0065808 | A1* | 2/2019 | Zhang | G06F 3/0481 |

FOREIGN PATENT DOCUMENTS

| | | |
|---|---|---|
| KR | 10-1241625 B1 | 3/2013 |
| KR | 10-2015-0024451 A | 3/2015 |
| KR | 10-2015-0039113 A | 4/2015 |
| KR | 10-2015-0084193 A | 7/2015 |
| KR | 10-2016-0037305 A | 4/2016 |
| KR | 10-1632912 B1 | 6/2016 |
| KR | 10-2016-0123200 A | 10/2016 |

* cited by examiner

METHOD AND APPARATUS FOR PROCESSING DISTORTION OF FINGERPRINT IMAGE

CROSS-REFERENCE TO RELATED APPLICATION(S)

This application is a U.S. National Stage application under 35 U.S.C. § 371 of an International application number PCT/KR2018/000192, filed on Jan. 4, 2018, which is based on and claimed the benefit priority of a Korean patent application number 10-2017-0002496, filed on Jan. 6, 2017, in the Korean Intellectual Property Office, the entire disclosure of which is hereby incorporated by reference herein in its entirety.

TECHNICAL FIELD

The disclosure relates to a method and an apparatus for processing distortion of a fingerprint image.

BACKGROUND ART

The number and variety of services provided through portable electronic devices such as smartphones have gradually expanded. In order to increase the effective value of such electronic devices and satisfy various user needs, communication service providers or electronic device manufacturers have provided various functions and competitively developed electronic devices that are differentiated from those of other companies.

As the performance of electronic devices is advanced, various biometric recognition technologies are applied to portable electronic devices. Among various biometric recognition technologies, the most commonly used technology is a fingerprint recognition technology. User authentication through fingerprint recognition has advantages in that security is excellent and an authentication method is simple.

In the fingerprint recognition, a process of detecting ridge forms of different fingerprints, capturing bifurcations, ridge endings, and dots of fingerprints, and acquiring coordinates of features of each fingerprint is performed, and identity is determined through comparison between the acquired coordinates and existing data. Scanners for capturing a fingerprint may include a line-scan-type scanner for acquiring fingerprint data in a swipe scheme and an area-scan-type scanner for acquiring fingerprint data in a touch scheme.

DETAILED DESCRIPTION OF THE INVENTION

Technical Problem

Meanwhile, an electronic device including a display-integrated fingerprint sensor may use the surface of a display or a transparent cover located on the display as a fingerprint acquisition area, acquire information related to a fingerprint from a user's finger contacting the surface of the display or the transparent cover located on the display, and register or authenticate a user.

In general, the display serves to display information to the user and thus may be located on the outer surface of the electronic device and exposed to the outside. The display (or the transparent cover on the display) exposed to the outside may be contaminated by various factors such as dirt, scratches, cracks, or air drops between a liquid crystal film for protecting the display (or the transparent cover on the display) and the display (or the transparent cover on the display). When the electronic device performs fingerprint recognition using the contaminated display (or the transparent cover on the display), a problem of acquiring a distorted fingerprint image due to a contaminant may occur. When user authentication is performed using the distorted fingerprint image, there may be an error in the user authentication result, and when the distorted fingerprint image is stored in a database and is used as base information of fingerprint recognition, the fingerprint recognition rate of the electronic device may be constantly lower.

Various embodiments of the disclosure have been made to solve the problems, and may provide a method of identifying a contaminant on a display (or a transparent cover on the display) and a method of correcting a fingerprint image distorted by a contaminant on the display (or the transparent cover on the display) in fingerprint recognition through a display-integrated fingerprint sensor.

Technical Solution

In accordance with an aspect of the disclosure, an electronic device is provided. The electronic device includes: a housing; a transparent member configured to form at least a portion of the external surface of the electronic device and disposed in at least a portion of the housing; a display, at least a portion of which is housed in the housing, and which is disposed in at least a partial area of the transparent member; a fingerprint sensor formed in at least the portion of the area of the display; and a processor connected to the display and the fingerprint sensor, wherein the processor is configured to identify context information associated with a contaminant in at least the partial area of the transparent member corresponding to the fingerprint sensor through the fingerprint sensor, acquire biometric information through at least the partial area of the transparent member corresponding to the fingerprint sensor through the fingerprint sensor, and recognize the biometric information based on the context information.

In accordance with another aspect of the disclosure, a method of acquiring biometric information through an electronic device including a housing, a transparent member configured to form at least a portion of the external surface of the electronic device and disposed in at least a portion of the housing, a display 160, at least a portion of which is housed in the housing, and which is disposed in at least a partial area of the transparent member, a fingerprint sensor formed in at least a partial area of the display, and a processor connected to the display and the fingerprint sensor is provided. The method includes: identifying context information associated with a contaminant in at least a partial area of a transparent member corresponding to the fingerprint sensor through the fingerprint sensor; acquiring biometric information through at least the partial area of the transparent member corresponding to the fingerprint sensor through the fingerprint sensor; and configuring the electronic device to recognize the biometric information based on the context information.

Advantageous Effects

According to various embodiments of the disclosure, an electronic device including a display-integrated fingerprint sensor can identify a contaminant formed on a display (or a transparent cover on the display).

Further, according to various embodiments of the disclosure, an electronic device including a display-integrated fingerprint sensor can modify a fingerprint image distorted by a contaminant on a display (or a transparent cover on the display).

MODE FOR CARRYING OUT THE INVENTION

Figure 1:
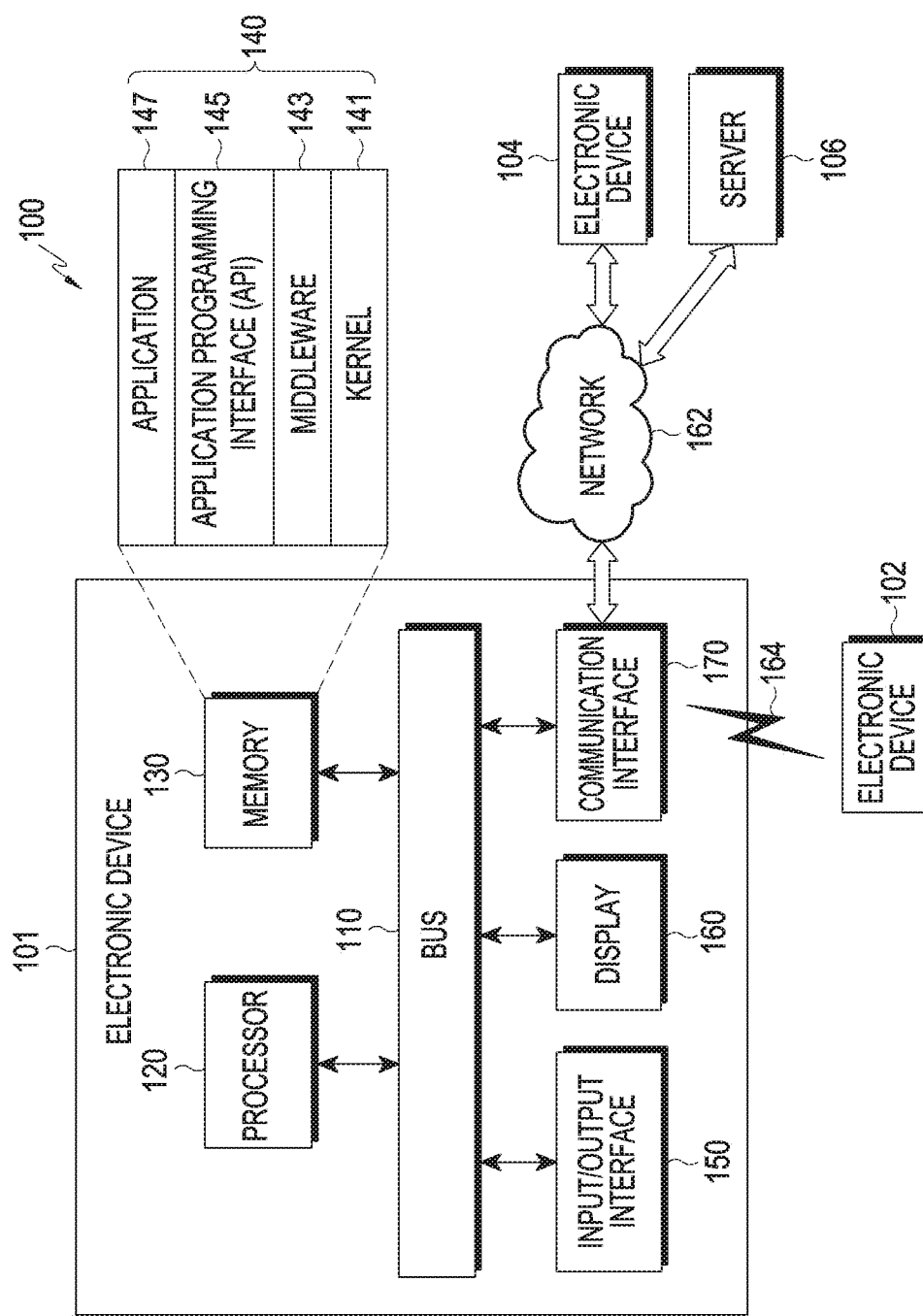
FIG. 1 illustrates a network environment including an electronic device according to an embodiment of the disclosure.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar elements. A singular expression may include a plural expression unless the context clearly indicates otherwise. In the disclosure, the expression "A or B" or "at least one of A and/or B" may include all possible combinations of items enumerated together. The expression "a first", "a second", "the first", or "the second" may modify corresponding elements regardless of the order or the importance thereof, and are used merely to distinguish each element from the others without unduly limiting the elements. When an element (e.g., first element) is referred to as being "(functionally or communicatively) connected," or "directly coupled" to another element (second element), the element may be connected directly to the another element or connected to the another element through yet another element (e.g., third element).

In the disclosure, the expression "configured to" may be used interchangeably with, for example, "suitable for", "having the capacity to", "adapted to", "made to", "capable of", or "designed to" in terms of hardware or software, according to circumstances. In some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric or clothing integrated type (e.g., electronic clothing), a body-mounted type (e.g., a skin pad or tattoo), and a bio-implantable type (e.g., an implantable circuit). In some embodiments, the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship and a gyrocompass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of two or more of the above-described various devices. The electronic device according to embodiments of the disclosure is not limited to the above-described devices. In the disclosure, the term "user" may indicate a person using an electronic device or a device (e.g., an artificial intelligence electronic device) using an electronic device.

Referring to FIG. 1, an electronic device 101 within a network environment 100 according to various embodiments will be described. The electronic device 101 may include a bus 110, a processor 120, a memory 130, an input/output interface 150, a display 160, and a communication interface 170. In some embodiments, the electronic device 101 may omit at least one of the elements, or may further include other elements. The bus 110 may include a circuit for connecting the elements 110 to 170 and transmitting communication (for example, control message or data) between the elements. The processor 120 may include one or more of a central processing unit, an application processor, and a communication processor (CP). The processor 120 may carry out, for example, operations or data processing relating to the control and/or communication of at least one other element of the electronic device 101.

The memory 130 may include volatile and/or nonvolatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or applications (or "apps") 147. At least some of the kernel 141, the middleware 143, and the API 145 may be referred to as an operating system. The kernel 141 may control or manage system resources (for example, the bus 110, the processor 120, or the memory 130) used for performing an operation or function implemented by the other programs (for example, the middleware 143, the API 145, or the applications 147). Furthermore, the kernel 141 may provide an interface through which the middleware 143, the API 145, or the applications 147 access the individual elements of the electronic device 101 to control or manage the system resources.

The middleware 143 may function as, for example, an intermediary for allowing the API 145 or the applications 147 to communicate with the kernel 141 to exchange data. Furthermore, the middleware 143 may process one or more task requests, which are received from the applications 147, according to priorities thereof. For example, the middleware 143 may assign a priority to at least one of the applications 147 to first use the system resources (for example, the bus 110, the processor 120, or the memory 130) of the electronic device 101 and process the one or more task requests. The API 145 is an interface through which the applications 147 control a function provided by the kernel 141 or the middleware 143 and may include, for example, at least one interface or function (for example, instructions) for controlling files, controlling windows, processing images, or controlling messages. For example, the input/output interface 150 may forward instructions or data, input from a user or an external device, to other element(s) of the electronic device 101, or may output instructions or data, received from the other element(s) of the electronic device 101, to the user or another external device.

The display 160 may include, for example, a Liquid Crystal Display (LCD), a Light-Emitting Diode (LED) display, an Organic Light-Emitting Diode (OLED) display, a Micro Electro Mechanical System (MEMS) display, or an electronic paper display. The display 160 may display various pieces of content (for example, text, images, videos, icons, and/or symbols) to the user. The display 160 may include a touch screen and may receive, for example, touch, gesture, proximity, or hovering input using an electronic pen or the user's body part.

The communication interface 170 may establish communication between, for example, the electronic device 101 and an external device (for example, a first external electronic device 102, a second external electronic device 104, or a server 106). For example, the communication interface 170 may be connected to a network 162 through wireless communication or wired communication and may communicate with the external device (for example, the second external electronic device 104 or the server 106).

The wireless communication may include, for example, cellular communication that uses at least one of LTE, LTE-Advanced (LTE-A), code-division multiple access (CDMA), wideband CDMA (WCDMA), universal mobile telecommunications system (UNITS), wireless broadband (WiBro), global system for mobile communications (GSM), or the like. According to an embodiment, the wireless communication may include, for example, at least one of Wi-Fi, Bluetooth, Bluetooth Low Energy (BLE), ZigBee, Near-Field Communication (NFC), magnetic secure transmission, Radio Frequency (RF), and Body Area Network (BAN). According to an embodiment, the wired communication may include GNSS. The GNSS may be, for example, a global positioning system (GPS), a global navigation satellite system (GLONASS), a BeiDou navigation satellite system (hereinafter, referred to as "BeiDou"), or Galileo (the European global satellite-based navigation system). Hereinafter, in this document, the term "GPS" may be interchangeable with the term "GNSS". The wired communication may include, for example, at least one of a Universal Serial Bus (USB), a High-Definition Multimedia Interface (HDMI), Recommended Standard 232 (RS-232), power line communication, a Plain Old Telephone Service (POTS), and the like. The network 162 may include a telecommunications network, for example, at least one of a computer network (for example, a LAN or a WAN), the Internet, and a telephone network.

Each of the first and second external electronic devices 102 and 104 may be of a type the same as or different from that of the electronic device 101. According to various embodiments, all or some of the operations executed by the electronic device 101 may be executed by another electronic device or a plurality of electronic devices (for example, the electronic device 102 or 104, or the server 106). According to an embodiment, when the electronic device 101 should perform some functions or services automatically or in response to a request, the electronic device 101 may additionally make a request for at least some functions related thereto to another device (for example, the electronic device 102 or 104, or the server 106) instead of performing the functions or services by itself. Another electronic device (for example, the electronic device 102 or 104, or the server 106) may execute a requested function or an additional function and transfer the result thereof to the electronic device 101. The electronic device 101 may provide the received result as it is, or may perform additional processing before providing the requested functions or services. To this end, for example, cloud-computing, distributed-computing, or client-server-computing technology may be used.

An electronic device according to various embodiments of the disclosure may include: a housing; a transparent member configured to form at least a portion of the external surface of the electronic device and disposed in at least a portion of the housing; a display 160, at least a portion of which is housed in the housing, and which is disposed in at least a partial area of the transparent member; a fingerprint sensor formed in at least a partial area of the display; and a processor connected to the display and the fingerprint sensor, wherein the processor is configured to identify context information associated with a contaminant in at least the partial area of the transparent member corresponding to the fingerprint sensor through the fingerprint sensor, acquire biometric information through at least the partial area of the transparent member corresponding to the fingerprint sensor through the fingerprint sensor, and recognize the biometric information based on the context information.

In the electronic device according to various embodiments of the disclosure, the processor may be configured to acquire an image of at least the partial area of the transparent member corresponding to the fingerprint sensor through the fingerprint sensor, and the acquired image may include a first image captured before a fingerprint is input into the fingerprint sensor, a second image captured while a fingerprint is being input into the fingerprint sensor, and a third image captured after a fingerprint is input into the fingerprint sensor.

In the electronic device according to various embodiments of the disclosure, the processor may be configured to identify a contaminant in at least the partial area of the transparent member included in at least one of the first image and the third image and modify a fingerprint image included in the second image based on the identified contaminant.

In the electronic device according to various embodiments of the disclosure, the electronic device may further include a memory, and the processor may be configured to perform authentication for the modified fingerprint image by comparing the modified fingerprint image with at least one fingerprint image pre-stored in the memory.

In the electronic device according to various embodiments of the disclosure, the processor may be configured to output an elimination guide corresponding to the identified context information through the display.

In the electronic device according to various embodiments of the disclosure, the processor may be configured to output content associated with another authentication means which is not influenced by the contaminant in at least the partial area of the transparent member based on the identified context information.

In the electronic device according to various embodiments of the disclosure, the processor may be configured to receive a signal related to a detection mode of the fingerprint sensor and determine at least one of an operation time of the fingerprint sensor and an image acquisition speed of the fingerprint sensor based on the received signal.

In the electronic device according to various embodiments of the disclosure, the processor may be configured to acquire an image of at least the partial area of the transparent member corresponding to the fingerprint sensor through the fingerprint sensor, divide the acquired image into a plurality of pixels, calculate a spatial average value of the acquired image using the plurality of pixels resulting from division, detect contaminated pixels among the plurality of pixels resulting from division based on the calculated spatial average value, and identify at least one contaminant through the detected pixels.

In the electronic device according to various embodiments of the disclosure, the processor may be configured to acquire a plurality of images of at least the partial area of the transparent member corresponding to the fingerprint sensor through the fingerprint sensor, divide each of the plurality of acquired images into a plurality of pixels, calculate a change in each of the plurality of pixels resulting from division according to time, detect contaminated pixels among the plurality of pixels resulting from division based on the calculated change, and identify the at least one contaminant through the detected pixels.

In the electronic device according to various embodiments of the disclosure, the processor may be configured to acquire a plurality of images of at least the partial area of the transparent member corresponding to the fingerprint sensor through the fingerprint sensor, select a first image and a second image successively acquired among the plurality of acquired images, acquire a differential image based on the selected first image and second image, and identify the at least one contaminant included in the first image and the second image based on the acquired differential image.

In the electronic device according to various embodiments of the disclosure, the processor may be configured to acquire a plurality of images of at least the partial area of the transparent member corresponding to the fingerprint sensor through the fingerprint sensor, convert each of the plurality of acquired images into a binary image, divide each of the converted binary images into a plurality of pixels, identify that an area corresponding to a white pixel among the plurality of pixels resulting from division is a masking pixel, and identify at least one contaminant using the identified masking pixel.

Figure 2:
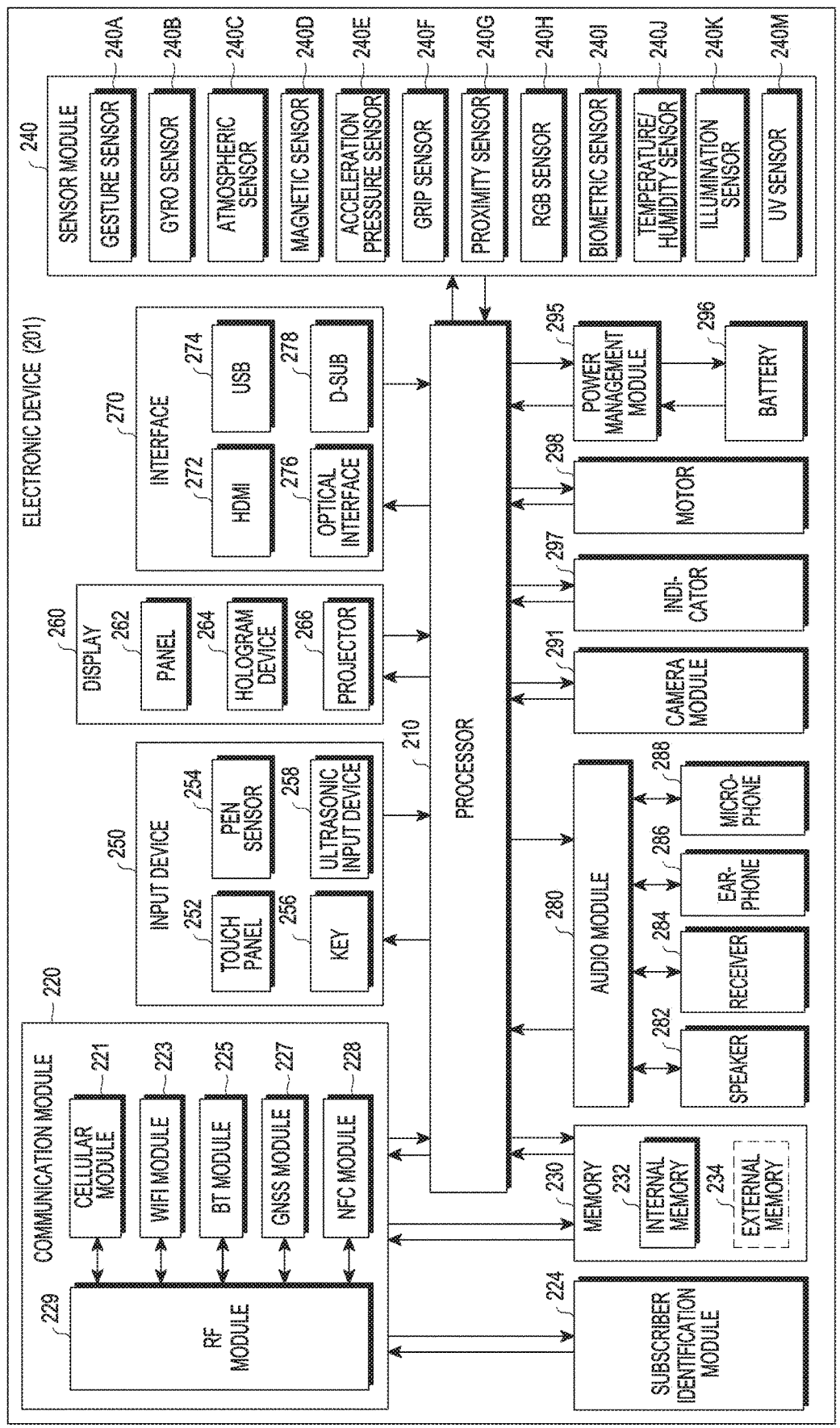
FIG. 2 is a block diagram of an electronic device according to various embodiments of the disclosure.

FIG. 2 is a block diagram of an electronic device 201 according to various embodiments. The electronic device 201 may include, for example, all or part of the electronic device 101 illustrated in FIG. 1. The electronic device 201 may include one or more processors (for example, APs) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an operating system or an application. The processor 210 may be implemented as, for example, a System on Chip (SoC). According to an embodiment, the processor 210 may further include a graphic processing unit (GPU) and/or an image signal processor. The processor 210 may include at least some of the elements (for example, a cellular module 221) illustrated in FIG. 2. The processor 210 may load a command or data received from at least one of other elements (for example, nonvolatile memory) to the volatile memory, process the command or data, and store resultant data in the nonvolatile memory.

The communication module 220 (for example, the communication interface 170) may have a configuration which is the same as or similar to that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a communication processor (CP). In some embodiments, at least some (for example, two or more) of the cellular module 221, the Wi-Fi module 223, the Bluetooth module 225, the GNSS module 227, and the NFC module 228 may be included in a single Integrated Chip (IC) or IC package. The RF module 229 may transmit/receive, for example, a communication signal (for example, an RF signal). The RF module 229 may include, for example, a transceiver, a power amp module (PAM), a frequency filter, a low-noise amplifier (LNA), an antenna, or the like. According to another embodiment, at least one of the cellular module 221, the Wi-Fi module 223, the BT module 225, the GNSS module 227, and the NFC module 228 may transmit/receive an RF signal through a separate RF module. The subscriber identification module 224 may include, for example, a card that includes a subscriber identification module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a DRAM, an SRAM, an SDRAM, or the like) and a nonvolatile memory (for example, a One-Time Programmable ROM (OTPROM), a PROM, an EPROM, an EEPROM, a mask ROM, a flash ROM, a flash memory, a hard disc drive, or a Solid-State Drive (SSD)). The external memory 234 may include a flash drive, for example, compact flash (CF), secure digital (SD), Micro-SD, Mini-SD, eXtreme digital (xD), a multimedia card (MMC), a memory stick, and the like. The external memory 234 may be functionally and/or physically connected to the electronic device 201 through any of various interfaces.

The sensor module 240 may measure, for example, a physical quantity or detect the operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may be, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, a projector 266, and/or a control circuit for controlling the same. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure the strength of pressure of a user's touch. The pressure sensor may be implemented so as to be integrated with the touch panel 252, or may be implemented as one or more sensors separate from the touch panel 252. The hologram device 264 may show a three-dimensional image in the air using light interference. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) interface 278. The interface 270 may be included in, for example, the communication interface 170 illustrated in FIG. 1. Additionally or alternatively, the interface 270 may, for example, include a mobile high-definition link (MHL) interface, a secure digital (SD) card/multimedia card (MMC) interface, or an infrared data association (IrDA) standard interface.

The audio module 280 may convert, for example, sound into an electrical signal and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, and the like. The camera module 291 is a device that can take a still image and a moving image. According to an embodiment, the camera module 291 may include one or more image sensors (for example, a front sensor or a rear sensor), a lens, an image signal processor (ISP), or a flash (for example, an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. Examples of the wireless charging method may include a magnetic-resonance method, a magnetic-induction method, an electromagnetic-wave method, and the like. Additional circuits (for example, a coil loop, a resonance circuit, a rectifier, and the like) for wireless charging may be further included. The battery gauge may measure, for example, the remaining charge of the battery 296 and a voltage, current, or temperature while charging. The battery 296 may include, for example, a rechargeable battery and/or a solar battery.

The indicator 297 may display specific statuses of the electronic device 201 or a portion thereof (for example, the processor 210), for example, a booting status, a message status, or a charging status). The motor 298 may convert an electrical signal into a mechanical vibration and may generate a vibration, a haptic effect, or the like. The electronic device 201 may include a mobile TV support device (for example, a GPU) that can process media data according to a standard, such as digital multimedia broadcasting (DMB), digital video broadcasting (DVB), mediaFlo™, and the like. Each of the above-described component elements of hardware according to the disclosure may be configured with one or more components, and the names of the corresponding component elements may vary based on the type of the electronic device. In various embodiments, an electronic device (for example, the electronic device 201) may omit some elements or may further include additional elements, or some of the elements of the electronic device may be combined with each other to configure one entity, in which case the electronic device may identically perform the functions of the corresponding elements prior to the combination thereof.

Figure 3:
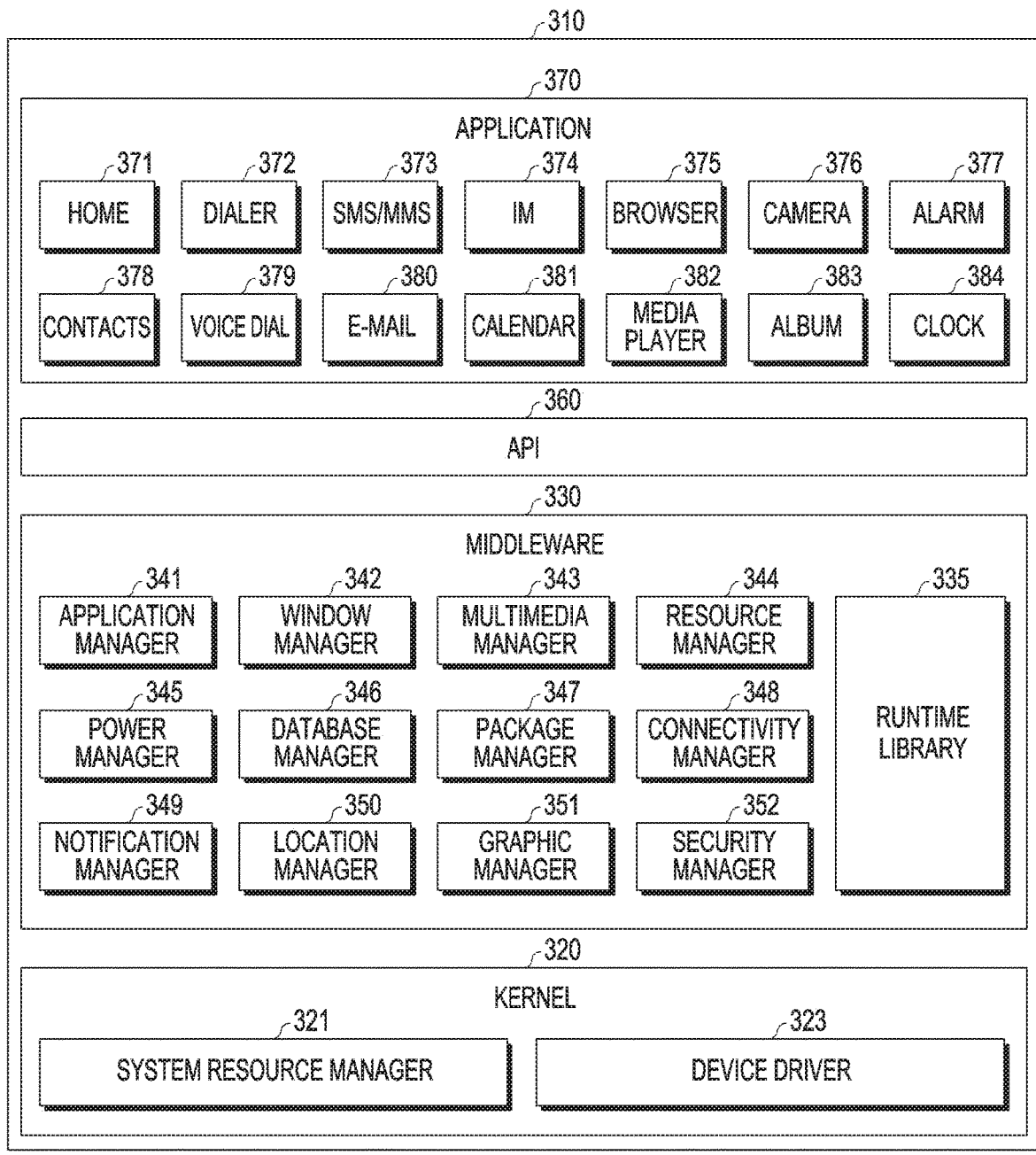
FIG. 3 is a block diagram of a program module according to various embodiments of the disclosure.
Figure 4A:
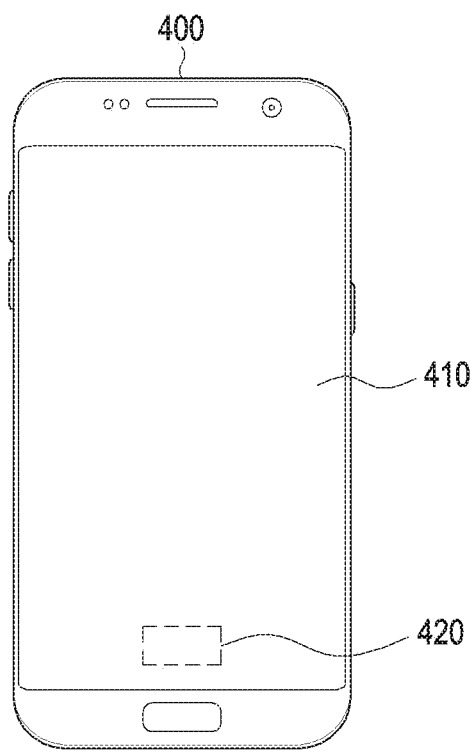
FIGS. 4A to 4D illustrate the structure of an electronic device according to various embodiments of the disclosure.
Figure 4B:
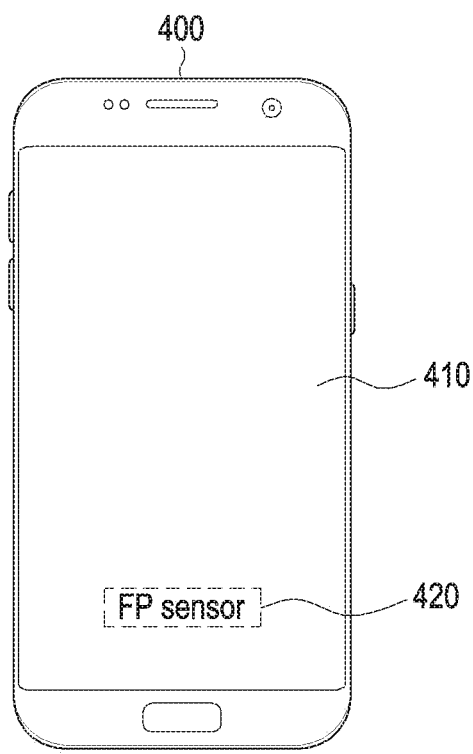
Figure 4C:
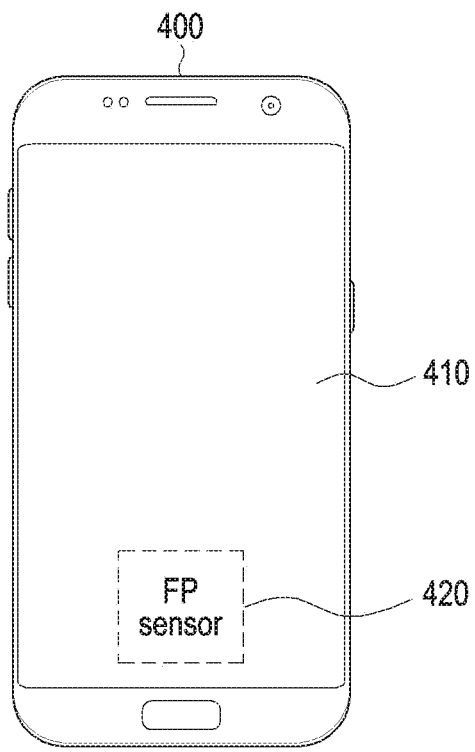
Figure 4D:
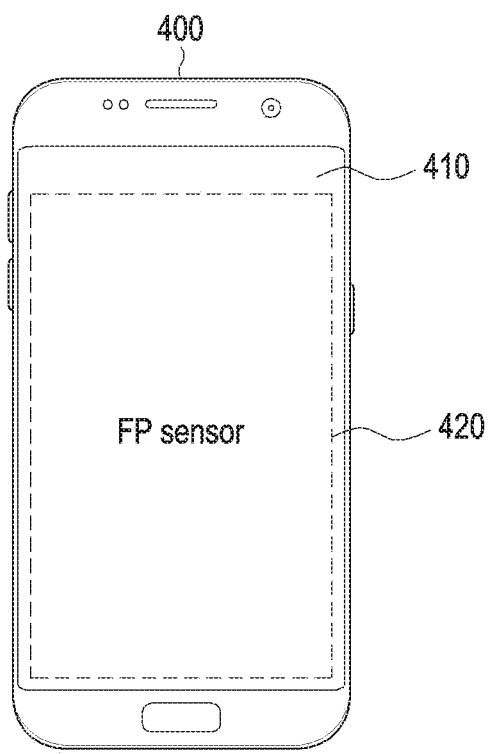

FIG. 3 is a block diagram of a program module according to various embodiments. According to an embodiment, the program module 310 (for example, the program 140) may include an Operating System (OS) that controls resources relating to an electronic device (for example, the electronic device 101) and/or various applications (for example, the applications 147) that are driven on the operating system. The operating system may include, for example, Android™, iOS™, Windows™ Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the applications 147). At least a part of the program module 310 may be preloaded on the electronic device, or may be downloaded from an external electronic device (for example, the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file-system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function required by the applications 370 in common, or may provide various functions to the applications 370 through the API 360 such that the applications 370 can efficiently use the limited system resources within the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage input/output, manage memory, or process arithmetic functions. The application manager 341 may manage, for example, the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source code of the applications 370 or the space in memory. The power manager 345 may manage, for example, the capacity or power of a battery and may provide power information required for operating the electronic device. According to an embodiment, the power manager 345 may operate in conjunction with a basic input/output system (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide information on events (for example, an arrival message, an appointment, a proximity notification, or the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication features. According to an embodiment, the middleware 330 may include a telephony manager for managing a voice or video call function of the electronic device or a middleware module that is capable of forming a combination of the functions of the above-described elements. According to an embodiment, the middleware 330 may provide specialized modules depending on the operating system. The middleware 330 may dynamically remove some existing elements, or may add new elements. The API 360 is, for example, a set of API programming functions, and may be provided with different configurations depending on the operating system. For example, in the case of Android or iOS, one API set may be provided for each platform, and in the case of Tizen, two or more API sets may be provided for each platform.

The applications 370 (for example, the applications 147A) may include, for example, one or more applications that can perform functions, such as home 371, a dialer 372, SMS/MMS 373, Instant Messaging (IM) 374, a browser 375, a camera 376, an alarm 377, contacts 378, a voice dialer 379, e-mail 380, a calendar 381, a media player 382, an album 383, a clock 384, health care (for example, measuring exercise quantity or blood sugar), environmental information provision (for example, providing atmospheric pressure, humidity, temperature information, and the like), and the like. According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device and provide the received notification information to a user. The device management application may perform a function (for example, a function of turning on/off an external electronic device (or some elements thereof) or controlling the brightness (or resolution) of the display) of the external electronic device communicating with the electronic device or install, delete, or update an application executed by the external electronic device. According to an embodiment, the applications 370 may include applications (for example, a health-care application of a mobile medical appliance) that are designated according to the attributes of an external electronic device. According to an embodiment, the applications 370 may include applications received from an external electronic device. At least some of the program module 310 may be implemented (for example, executed) by software, firmware, hardware (for example, the processor 210), or a combination of two or more thereof and may include a module, a program, a routine, an instruction set, or a process for performing one or more functions.

FIGS. 4A to 4D illustrate the structure of an electronic device according to various embodiments of the disclosure.

An electronic device 400 (for example, the electronic device 101 or 201) according an embodiment of the disclosure may include a display 410 (for example, the display 160 or 260) and a display-integrated fingerprint sensor 420.

The display 410 may include, for example, a Liquid Crystal Display (LCD), a Light-Emitting Diode (LED) display, an Organic Light-Emitting Diode (OLED) display, a Micro Electro Mechanical System (MEMS) display, or an electronic paper display. The display 410 may display, for example, various pieces of content (for example, text, images, videos, icons, and/or symbols) to the user. The display 410 may include a touchscreen and may receive, for example, a touch, gesture, proximity, or hovering input using an electronic pen or the user's body part. Further, the display 410 may display information to the outside through a transparent cover on the display 410.

Hereinafter, unless mentioned specifically, the display used in this document refers to an integrated display including a transparent cover (for example, a transparent cover 1710). For example, a contaminant on the display may be a contaminant on the transparent cover (for example, the transparent cover 1710) located on the display (for example, the display 1740). Further, the contaminant on the display may be a contaminant between the display (for example, the display 1740) and the transparent cover (for example, the transparent cover 1710) located on the display (for example, the display 1740). In addition, the contaminant on the display may be cracking of at least one pixel included in the display (for example, the display 1740). The embodiment and the terms used in the embodiment do not limit the technology described in this document to the specific embodiment, but should be construed as a portion of various embodiments of the technology described in this document.

The display-integrated fingerprint sensor 420 may be electrically connected to the display 410 and may acquire a fingerprint image from a user's finger which contacts a partial area of the display 410.

The display-integrated fingerprint sensor 420 may be configured in various forms depending on the display 410 and the arrangement type of the sensor structure. For example, in the in/on-cover glass type, the sensing structure or an electrode for acquiring a fingerprint image is printed on the surface of the transparent cover or is disposed through etching. The transparent cover may be a cover that may be disposed on the display in order to protect the display. In the over-display type, the sensing structure or an electrode for acquiring a fingerprint image is disposed on a display panel, and the over-display type may include the in/on-cover glass type. In the under-display type, the sensing structure or an electrode for acquiring a fingerprint image is disposed below the display panel. In the in-display type, the sensing structure or an electrode for acquiring a fingerprint image is disposed in an internal area of pixels of the display panel or in a black matrix area between pixels.

The display-integrated fingerprint sensor 420 may be divided into an optical-type sensor, a capacitive-type sensor, and an ultrasound-type sensor depending on the manner in which a fingerprint image is acquired. For example, the optical type is a type for capturing the surface of a finger through a photodiode and acquiring a fingerprint image. The capacitive type is a type for acquiring a fingerprint image on the basis of the principle whereby a portion (ridge) of the fingerprint contacting the electrode is detected and a portion (valley) of the fingerprint that does not contact the electrode is not detected. The ultrasound type is a type for generating ultrasound waves on the basis of the piezo principle and acquiring a fingerprint image using a path difference between ultrasound waves reflected from the ridge and the valley of the fingerprint.

According to an embodiment of the disclosure, the size (or shape) and the location of a sensing area of the display-integrated fingerprint sensor 420 may be variously determined. As illustrated in FIGS. 4A to 4D, the sensing area of the display-integrated fingerprint sensor 420 may be a rectangular or square shape, and the size thereof may correspond to a part or entirety of the display 410. Meanwhile, the size (or shape) and the location of the sensing area of the display-integrated fingerprint sensor 420 are not limited to the embodiments illustrated in FIGS. 4A to 4D, and the electronic device 400 may include sensing areas in various shapes and a plurality of sensing areas.

Among the terms used hereinafter, the term "fingerprint template" may refer to a user's fingerprint image or fingerprint information registered and stored in the electronic device. The fingerprint template may be stored in the form of an image corresponding to a user's fingerprint, and may be stored in the form of information passing through a process of extracting feature points from the user's fingerprint and transforming and encrypting the same for security thereof. Further, the fingerprint template may be stored in an area separated from other data through technology such as TrustZone™. When performing authentication of a newly acquired fingerprint image, the stored fingerprint template may be used as a reference image, which is a target to be compared with the newly acquired fingerprint image. For example, in order to determine whether a user corresponding to the newly input fingerprint image matches a user corresponding to the stored fingerprint template, the newly input fingerprint image may be compared with the stored fingerprint template.

Figure 5:
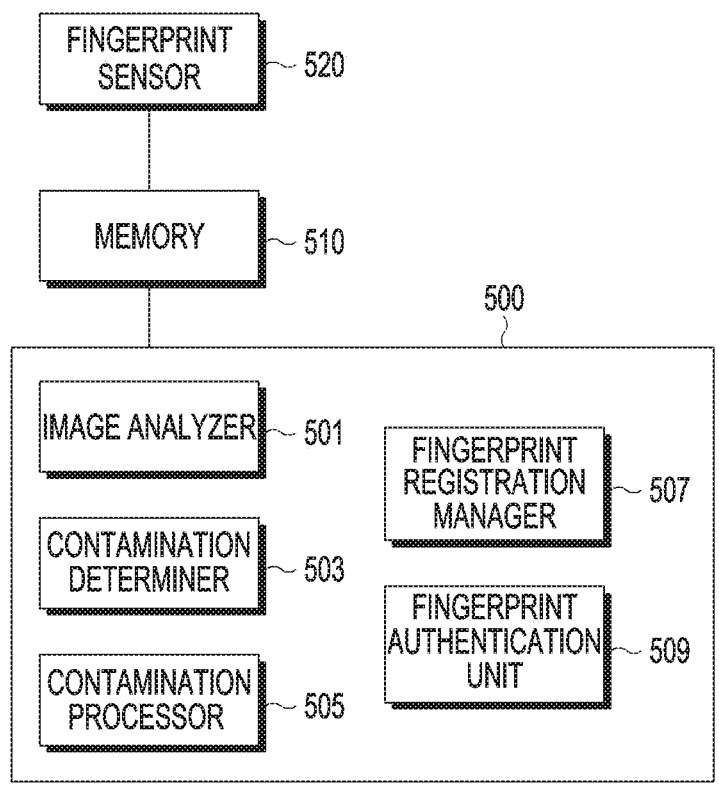
FIG. 5 illustrates elements of an electronic device according to various embodiments of the disclosure.

FIG. 5 illustrates elements of an electronic device according to various embodiments of the disclosure.

An electronic device (for example, the electronic device 101, 201, or 400) according to an embodiment of the disclosure may include a processor 500, a memory 510, and a fingerprint sensor 520.

The processor 500 may be electrically connected to other elements within the electronic device and may control other elements within the electronic device on the basis of signals input from the outside. The processor 500 may include at least one of an image analyzer 501, a contamination determiner 503, a contamination processor 505, a fingerprint registration manager 507, and a fingerprint authentication unit 509.

The image analyzer 501 may analyze a fingerprint image acquired through the fingerprint sensor 520. For example, the image analyzer 501 may compare a plurality of fingerprint images or a plurality of pixels included in a single fingerprint image so as to detect similarities and differences between the plurality of fingerprint images or the plurality of pixels. Further, the image analyzer 501 may identify contrast of the plurality of pixels included in the fingerprint image. With respect to the plurality of pixels included in the fingerprint image, the image analyzer 501 may calculate a change in a pixel value over time. The image analyzer 501 may perform an image-processing operation for identifying at least one contaminant included in the fingerprint image. For example, the image analyzer 501 may perform an image-processing operation on the fingerprint image to represent, in black and white, the fingerprint image in a gray scale.

The contamination determiner 503 may identify at least one contaminant included in the fingerprint image on the basis of the fingerprint image analyzed through the image analyzer 501. The contamination determiner 503 may determine whether the display is contaminated by identifying at least one contaminant included in the fingerprint image. When at least one contaminant included in the fingerprint image is identified, the contamination determiner 503 may determine the type, location, and size of the identified contaminant. The contamination determiner 503 may identify at least one contaminant on the basis of data pre-stored in the memory 510. Further, the contamination determiner 503 may store information related to the identified contaminant in the memory 510 again and may use the stored information for identifying other contaminant.

The contamination processor 505 may generate content related to a method of modifying the acquired fingerprint image or removing the identified contaminant in order to prevent a decrease in a fingerprint recognition rate or an error in user authentication that may be generated due to the contaminant identified through the contamination determiner 503. For example, the contamination processor 505 may modify a portion of the fingerprint image that is distorted due to the identified contaminant. Further, when it is determined that the identified contaminant can be eliminated, the contamination processor 505 may display content related to a method of removing the identified contaminant from the display of the electronic device. The user of the electronic device can eliminate the contaminant identified through the contamination determiner 503 on the basis of the content displayed on the display. When it is determined that the identified contaminant cannot be eliminated, the contamination processor 505 may display content indicating that user authentication through the fingerprint sensor 520 is not possible on the display of the electronic device. The user of the electronic device may perform user authentication through other authentication means (for example, iris recognition or password input) on the basis of the content displayed on the display.

The fingerprint registration manager 507 may register the fingerprint image acquired through the fingerprint sensor 520 as a user's fingerprint template and store the registered fingerprint template in the memory 510 of the electronic device. The fingerprint template registered and stored in the electronic device may be used as a reference image, which is a target to be compared with a newly acquired fingerprint image, in user authentication. The fingerprint registration manager 507 may update at least one the fingerprint templates stored in the memory 510 on the basis of the result of fingerprint authentication performed by the fingerprint authentication unit 509.

The fingerprint authentication unit 509 may execute a matching algorithm for determining whether the fingerprint image acquired through the fingerprint sensor 520 or the fingerprint image modified through the contamination processor 505 matches the fingerprint template stored in the memory 510. The fingerprint authentication unit 509 may perform user authentication on the basis of the result of the matching algorithm.

The memory 510 may store the fingerprint image acquired through the fingerprint sensor 520 or the fingerprint image modified through the contamination processor 505, and may also store the fingerprint template registered through the fingerprint registration manager 507. The memory 510 may include volatile memory and/or nonvolatile memory. The memory 510 may store a command or data related to at least one other element of the electronic device. The memory 510 may store software and/or the program 140.

The fingerprint sensor 520 is the display-integrated fingerprint sensor 420 and may be connected to the display 410 of the electronic device. For example, the fingerprint sensor 520 may be electrically connected to the display 410. The fingerprint sensor 520 may be physically connected to the display 410 such that the sensing structure or electrode for acquiring a fingerprint image is disposed in at least a partial area of the display 410.

The fingerprint sensor 520 may use the display 410 included in the electronic device as a fingerprint acquisition area. For example, the fingerprint sensor 520 may acquire a fingerprint image through the sensing structure or electrode for acquiring the fingerprint image, the sensing structure and electrode being disposed on an upper part (or on a transparent cover located on the display), a lower part, or in an internal area of the panel of the display.

The above embodiments are embodiments for describing elements of the electronic device disclosed in this document, and the roles of some elements may be integrated or subdivided.

Figure 6:
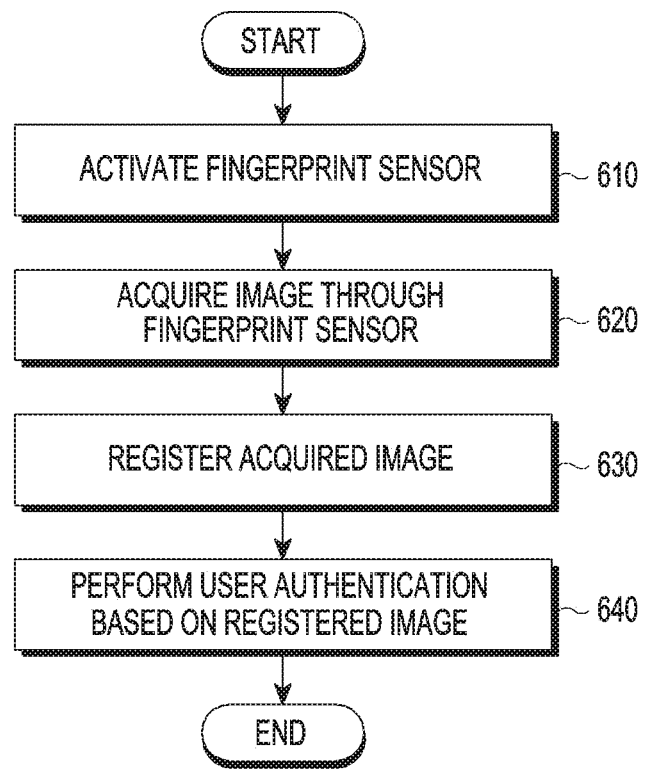
FIG. 6 is a flowchart illustrating a process of registering a fingerprint template through an electronic device according to various embodiments of the disclosure.

FIG. 6 is a flowchart illustrating a process of registering a fingerprint template through an electronic device (for example, the electronic device 101, 201, or 400) according to various embodiments of the disclosure.

In operation 610, a processor (for example, the processor 120 or 210) of the electronic device may receive a request related to registration of a fingerprint template. For example, in order to register the fingerprint template, the user of the electronic device may execute an application for registering the fingerprint image. The processor of the electronic device may activate the fingerprint sensor in response to execution of the application.

When the fingerprint sensor of the electronic device is not used, the fingerprint sensor may operate in a sleep state in consideration of efficiency of power management. Upon receiving a signal related to fingerprint input, the processor of the electronic device may activate the fingerprint sensor. For example, when the fingerprint sensor of the electronic device is the optical type, the processor may activate a light source (backlight) to acquire a fingerprint image. The light source may vary depending on the location of the fingerprint sensor or the type of the light source.

The fingerprint sensor may use light output from the display of the electronic device as the light source. For example, when the display of the electronic device is an active matrix organic light-emitting diode (AMOLED) display, the light source may be the pixels of the AMOLED display, which emits light. When the display of the electronic device is an LCD display, the light source may be an LCD backlight. The fingerprint sensor may use a light source such as a separate LED or infrared diode (IRED) included in the electronic device as the light source. The processor may activate the fingerprint sensor by activating the light source.

In operation 620, the processor of the electronic device may acquire a fingerprint image through the activated fingerprint sensor. The fingerprint sensor according to an embodiment is a display-integrated fingerprint sensor and may use the display of the electronic device as a fingerprint acquisition area. The processor may acquire at least one fingerprint image from a user's finger contacting the display.

The fingerprint images that the processor acquires through the fingerprint sensor may include at least one of an image of the display captured through the fingerprint sensor before the user's finger contacts the display, an image captured through the fingerprint sensor while the user's finger is contacting the display, and an image of the display captured through the fingerprint sensor after the user's finger is removed from the display. For example, the processor may capture the display in the state in which the user's finger does not contact the fingerprint acquisition area of the display through the activated fingerprint sensor. In other words, the processor may capture the surface of the empty display through the activated fingerprint sensor.

When the fingerprint image is acquired through the fingerprint sensor, the processor may determine whether distortion is generated in the fingerprint image acquired through the fingerprint sensor. For example, the processor may identify at least one contaminant on the display through the image of the display captured through the fingerprint sensor before the user's finger contacts the display. Further, the processor may identify at least one contaminant on the display through the image of the display captured through the fingerprint sensor after the user's finger, having contacted the display, is removed from the display. The processor may determine whether distortion is generated in the acquired fingerprint image on the basis of the identified contaminant. When distortion is generated in the acquired fingerprint, the processor may modify the acquired fingerprint image.

In operation 630, the processor of the electronic device may register the fingerprint image acquired through the activated fingerprint sensor as a user's fingerprint template. In operation 620, the acquired fingerprint image or the modified fingerprint image may be registered as the user's fingerprint template and may be stored in the memory of the electronic device.

In operation 640, the processor of the electronic device may perform user authentication on the basis of the registered fingerprint template. For example, after the user's fingerprint template is completely registered, the processor may receive a request related to user authentication. The processor may determine whether a newly acquired fingerprint image or a newly modified fingerprint image is the user's fingerprint image through a process of comparing the newly acquired fingerprint image or the newly modified fingerprint image with the fingerprint template stored in the memory.

Figure 7:
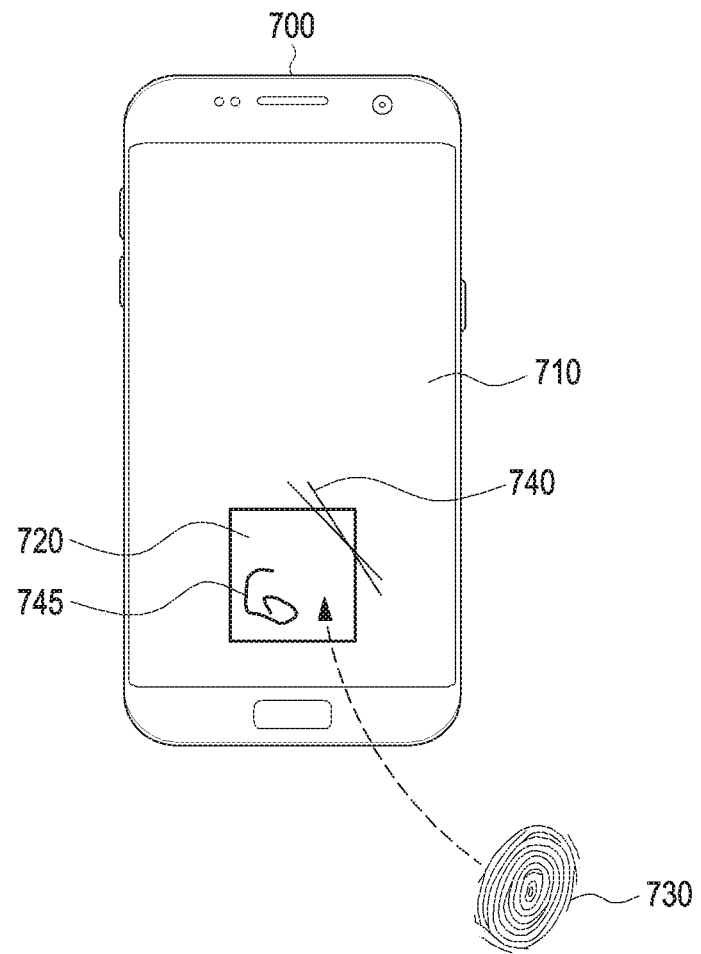
FIG. 7 illustrates a process of acquiring a contaminated fingerprint image through an electronic device according to various embodiments of the disclosure.

FIG. 7 illustrates a process of acquiring a contaminated fingerprint image through an electronic device according to various embodiments of the disclosure.

An electronic device 700 (for example, the electronic device 101, 201, or 400) according to an embodiment of the disclosure may include a display 710, a display-integrated fingerprint sensor (hereinafter, referred to as a fingerprint sensor), and a processor (not shown). The processor may acquire a fingerprint image 730 corresponding to a finger contacting a fingerprint acquisition area 720 of the display through the fingerprint sensor.

The display 710 may serve to display information to the user and thus may be located on the outer side surface of the electronic device 700 and exposed to the outside. The display 710 exposed to the outside and the transparent cover located on the display may be contaminated by scratches 740 or dirt 745. The fingerprint image 730 acquired through the contaminated fingerprint acquisition area 720 may include at least one contaminant.

The processor may change the operation mode of the fingerprint sensor in order to identify at least one contaminant existing in the fingerprint acquisition area 720. For example, when the recognition rate of the fingerprint sensor is smaller than a threshold value or when the fingerprint image included in the acquired image is distorted, the processor may change the operation mode of the fingerprint sensor from a default mode to a contamination detection mode.

The default mode of the fingerprint sensor may be a mode suitable for acquiring a fingerprint from a user's finger input into the fingerprint acquisition area 720. The fingerprint sensor activated in the default mode may not be suitable for acquiring an image for identifying a contaminant in the fingerprint acquisition area 720.

The contamination detection mode of the fingerprint sensor may be a mode suitable for identifying at least one contaminant in the fingerprint acquisition area 720. The fingerprint sensor activated in the contamination detection mode may capture the fingerprint acquisition area 720 even though there is no finger input into the fingerprint acquisition area 720. The fingerprint sensor activated in the contamination detection mode may have a higher speed at which the fingerprint acquisition area 720 is captured than the fingerprint sensor activated in the default mode. The fingerprint sensor activated in the contamination detection mode may acquire an image having a higher resolution than the fingerprint sensor activated in the default mode. For example, in order to determine whether the fingerprint acquisition area 720 is contaminated, the processor may acquire images before and after the user's finger contacts the fingerprint acquisition area 720. To this end, the processor may successively capture images multiples times at the moment at which the user's finger contacts and is then removed from the fingerprint sensor. For example, when the capture speed of the fingerprint sensor activated in the default mode is 5 frame/sec, the capture speed of the fingerprint sensor activated in the contamination detection mode may be 20 frame/sec.

Figure 8:
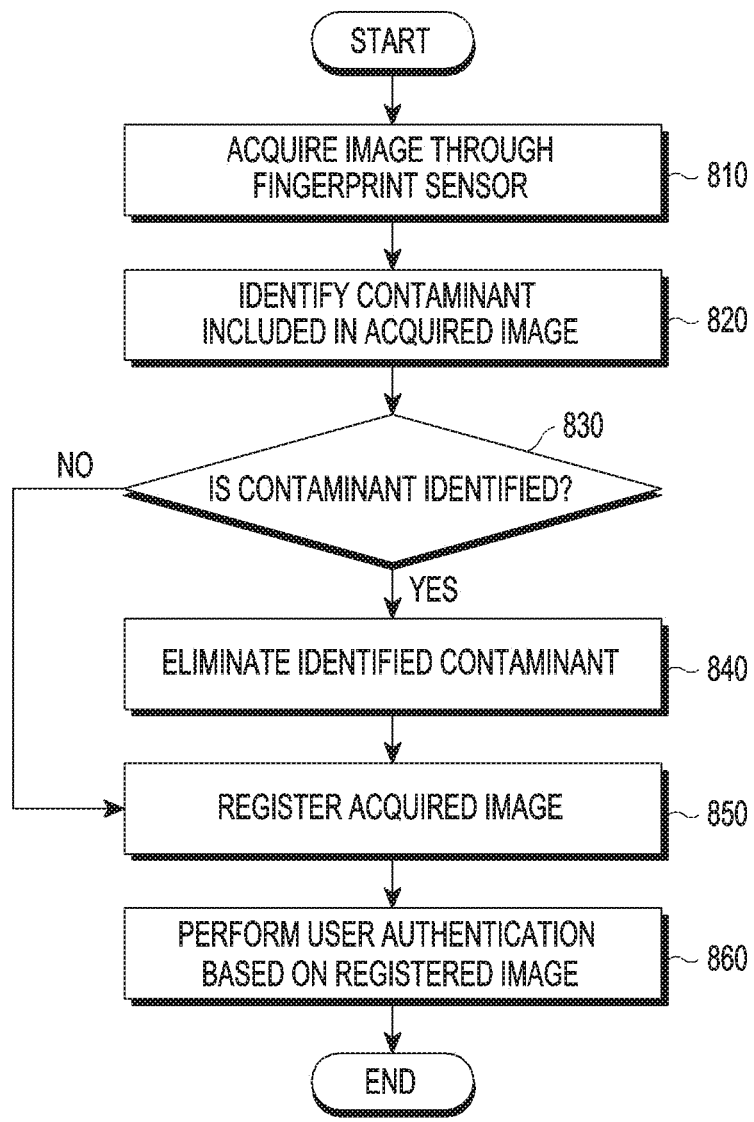
FIG. 8 is a flowchart illustrating a process of identifying a contaminant included in a fingerprint image through an electronic device according to various embodiments of the disclosure.

FIG. 8 is a flowchart illustrating a process of identifying a contaminant included in a fingerprint image through an electronic device according to various embodiments of the disclosure.

An electronic device (for example, the electronic device 101, 201, 400, or 700) according to an embodiment of the disclosure may include a display, a display-integrated fingerprint sensor (hereinafter, referred to as a fingerprint sensor), and a processor.

The processor of the electronic device may identify at least one contaminant in at least a partial area of the display (or a transparent cover located on the display) included in at least one acquired image. Hereinafter, embodiments of a method by which the processor identifies at least one contaminant included in an acquired image will be described.

<1> First Contamination Identification Method

According to an embodiment, when a fingerprint is input into a fingerprint sensor one time, the processor may acquire a plurality of successive images. In order to analyze the plurality of acquired images in units of pixels, the processor may divide each of the plurality of acquired images into a plurality of pixels. For example, when it is assumed that each of T successively acquired images is an image having N pixels in width and M pixels in length, a $t^{th}$ acquired image may be defined by equation (1). t is a parameter indicating the time or order at which each of the plurality of images is acquired, and may be understood as the order of acquisition in the present embodiment.

$$I(n,m,t); 1 \leq n \leq N, 1 \leq m \leq M, 1 \leq t \leq T \qquad \text{Equation (1)}$$

In Equation (1), n, m, and t may be defined as natural numbers. For example, I(1, 2, 3) denotes a pixel value of a pixel which is the first in width and the second in length among a plurality of pixels included in a third acquired image among T successively acquired images. Further, I(2, 4, 3) denotes a pixel value of a pixel which is the second in width and the fourth in length among the plurality of pixels included in the third acquired image among T successively acquired images. As a result, I(n, m, 3) may be a set of all pixel values of the plurality of pixels included in the third acquired image among T successively acquired images. That is, I(n, m, 3) may refer to a third acquired image among T successively acquired images.

At this time, the spatial average of a $t_0^{th}$ acquired image among T successively acquired images may be defined by Equation (2) below.

$$\text{spatial average } (t_0) = \frac{1}{MN} \sum_{n=1}^{N} \sum_{m=1}^{M} I(n, m, t_0) \qquad \text{Equation (2)}$$

The time average of a pixel value of a common specific pixel ($n_0$, $m_0$) among a plurality of pixels included in each of a plurality of successively acquired images may be defined by Equation (3) below.

$$\text{time average } (n_0, m_0) = \frac{1}{T} \sum_{t=1}^{T} I(n_0, m_0, t) \qquad \text{Equation (3)}$$

When it is assumed that a plurality of images acquired through the fingerprint sensor satisfies an Ergodic principle, the time average of a pixel value of a specific pixel ($n_0$, $m_0$) is the same as the spatial average of an image acquired at a specific time (for example, $t_0$). In other words, if the time average of the pixel value for the specific pixel can be calculated, the spatial average of the image acquired at the specific time may be obtained.

For example, in order to analyze each of a plurality of successively acquired images, the processor may divide each of the plurality of acquired images into a plurality of pixels. Through Equation (3), the processor may calculate the time average of a pixel value for each of the plurality of pixels resulting from division. When the calculated time average of a pixel value for a first pixel among the plurality of pixels resulting from division is within a preset range, the processor may determine that the first pixel is not contaminated. On the other hand, when the calculated time average of a pixel value for a second pixel among the plurality of pixels resulting from division is beyond the preset range, the processor may determine that the second pixel is contaminated.

That is, the processor calculates the time average of the pixel value for each of the plurality of pixels resulting from division and estimates the spatial average of an image acquired at a specific time on the basis of the calculated time average. The processor may identify a contaminated pixel among the plurality of pixels included in the image acquired at the specific time on the basis of the estimated spatial average.

According to another embodiment, the processor may detect a contaminated pixel on the basis of variance of the pixel value for the common specific pixel ($n_0$, $m_0$) among the plurality of pixels included in each of the plurality of successively acquired images.

Variance of the pixel value for the common specific pixel ($n_0$, $m_0$), among the plurality of pixels included in each of the plurality of successively acquired images, may be defined by Equation (4) below.

$$\sigma_I^2(n_0, m_0, t) = \frac{1}{T} \sum_{t=1}^{T} [I(n_0, m_0, t) - \mu_I(n_0, m_0, t)]^2, \qquad \text{Equation (4)}$$

$$\text{when } \mu_I(n_0, m_0, t) = \frac{1}{T} \sum_{t=1}^{T} I(n_0, m_0, t)$$

In Equation (4), $\sigma_I^2(n_0, m_0, t)$ denotes the variance of a pixel value for a common specific pixel ($n_0$, $m_0$) among a plurality of pixels included in each of a plurality of successively acquired images and $\mu_I(n_0, m_0, t)$ denotes the time average of a pixel value for a common specific pixel ($n_0$, $m_0$) among a plurality of pixels included in each of a plurality of successively acquired images, as defined in Equation (3) above.

The processor may calculate the time average of the pixel value for the specific pixel ($n_0$, $m_0$) through Equation (3). The processor may also calculate the variance of the pixel value for the specific pixel ($n_0$, $m_0$) on the basis of the calculated time average and Equation (4).

For example, in order to analyze each of a plurality of successively acquired images, the processor may divide each of the plurality of acquired images into a plurality of pixels. Through Equation (3), the processor may calculate the time average of a pixel value for each of the plurality of pixels resulting from division. The processor may calculate the variance of a pixel value for each of a plurality of pixels resulting from division on the basis of the calculated time average and Equation (4). When the calculated variance of the pixel value for the third pixel among the plurality of pixels resulting from division is smaller than a preset threshold, the processor may determine that the third pixel is contaminated. This is because small variance means a small change in the pixel value and a small change in the pixel value means unchanged permanent contamination in the corresponding pixel. On the other hand, when the calculated variance of the pixel value for the fourth pixel among the plurality of pixels resulting from division is equal to or larger than a preset threshold, the processor may determine that the fourth pixel is not contaminated.

According to the first contamination identification method, the processor may detect a contaminant commonly extracted from a plurality of images using the plurality of images accumulated during a process of authenticating the user.

<2> Second Contamination Identification Method

According to an embodiment, the processor may detect a contaminated pixel among pixels of a newly acquired image on the basis of a change in each of the pixels of the newly acquired image corresponding to each of the pixels of a pre-stored reference image. For example, the reference image and the time average of a pixel value for each of the pixels of the reference image may be pre-stored in the memory of the electronic device. The processor may calculate the time average of the pixel value for each of the pixels of the newly acquired image on the basis of the time average of the pixel value for each of the pixels of the pre-stored reference image.

The time average of a pixel value for a specific pixel ($n_0$, $m_0$) among the pixels of the newly acquired image may be defined by Equation (5) below. That is, it may be assumed that the pre-stored reference image is an image acquired at time t−1, which is the time previous to the current time, and the newly acquired image is an image acquired at time t, which is the current time. t is a parameter indicating the time or order at which each of the plurality of images is acquired, and may be understood as the time of acquisition according to the present embodiment.

$$\mu_I(n_0,m_0,t)=\alpha \cdot I(n_0,m_0,t)+(1-\alpha)\cdot \mu_I(n_0,m_0,t-1) \quad \text{Equation (5)}$$

In Equation (5), $\mu I(n_0, m_0, t-1)$ denotes the time average of a pixel value for a specific pixel ($n_0$, $m_0$) among pixels of a pre-stored reference image, $\mu_I(n_0, m_0, t)$ denotes the time average of a pixel value for a specific pixel ($n_0$, $m_0$) among pixels of a newly acquired image, and $I(n_0, m_0, t)$ denotes the pixel value for the specific pixel ($n_0$, $m_0$) among the pixels of the newly acquired image. Alpha (α) may be a forgetting factor, and may have a value larger than 0 and smaller than 1.

The processor may calculate the time average of pixel values for the pixels of the newly acquired image through Equation (5). Further, the processor may calculate the variance of pixel values for the pixels of the newly acquired image on the basis of the calculated time average.

The variance of the pixel values for the specific pixel ($n_0$, $m_0$) among the pixels of the newly acquired image may be defined by Equation (6) below.

$$\sigma_I^2(n_0,m_0,t)=\beta \cdot [1(n_0,m_0,t)-\mu_I(n_0,m_0,t)]^2+(1-\beta)\cdot \sigma_I^2(n_0,m_0,t-1) \quad \text{Equation (6)}$$

In Equation (6), $\sigma_I^2(n_0, m_0, t-1)$ denotes the variance of a pixel value for a specific pixel ($n_0$, $m_0$) among pixels of a pre-stored reference image, $\sigma_I^2(n_0, m_0, t)$ denotes the variance of a pixel value for a specific pixel ($n_0$, $m_0$) among pixels of a newly acquired image, $I(n_0, m_0, t)$ denotes the pixel value for the specific pixel ($n_0$, $m_0$) among pixels of the newly acquired image, and $\mu I(n_0, m_0, t)$ denotes the time average of a pixel value for a specific pixel ($n_0$, $m_0$) among pixels of a newly acquired image. Beta (β) may be a forgetting factor and may have a value larger than 0 and smaller than 1.

The processor may calculate the variance of the pixel value for the specific pixel ($n_0$, $m_0$) through Equation (6).

For example, the processor may divide the newly acquired image into a plurality of pixels in order to analyze the newly acquired image in units of pixels. The processor may calculate time average of the pixel value for each of the plurality of pixels resulting from the division on the basis of Equation (5). The processor may also calculate the variance of the pixel value for each of the plurality of pixels resulting from division on the basis of the calculated time average and Equation (6). When the calculated variance of the pixel value for the fifth pixel among the plurality of pixels resulting from division is smaller than a preset threshold, the processor may determine that the fifth pixel is contaminated. This is because small variance means a small change in the pixel value and the small change in the pixel value means unchanged permanent contamination in the corresponding pixel. On the other hand, when the calculated variance of the pixel value for the sixth pixel among the plurality of pixels resulting from division is equal to or larger than a preset threshold, the processor may determine that the sixth pixel is not contaminated.

According to the second contamination identification method, the processor may determine whether the newly acquired image is contaminated using a preset reference value. Even when the number of acquired images is only one, the processor may identify a contaminant in the acquired image or the fingerprint acquisition area. That is, the second contamination identification method does not need a plurality of accumulated images, unlike the first contamination identification method.

<3> Third Contamination Identification Method

According to an embodiment, in order to detect a contaminated pixel among pixels of a newly acquired image, the processor may use K images acquired right before the newly acquired image was acquired. For example, when it is assumed that the newly acquired image is an image acquired at time t, which is the current time, the processor may detect a contaminated pixel among the pixels of the newly acquired image using images acquired at time t−1 to time t−k.

The time average of a pixel value for a specific pixel ($n_0$, $m_0$) among the pixels of the newly acquired image may be defined using the images acquired at time t−1 to time t−k, as shown in Equation (7) below.

$$\mu_I(n_0, m_0, t) = \frac{1}{K}\sum_{a=1}^{K} I(n_0, m_0, t-a) \quad \text{Equation (7)}$$

In Equation (7), $\mu I(n_0, m_0, t)$ denotes the time average of a pixel value for a specific pixel ($n_0$, $m_0$), among pixels of a newly acquired image, and $I(n_0, m_0, t-a)$ denotes a pixel value for a specific pixel ($n_0$, $m_0$) among pixels of an image acquired at time t-a. K may be defined as a natural number, and time t may be understood as a parameter indicating the current time.

The processor may calculate the time average of pixel values for pixels of the newly acquired image through Equation (7). Further, the processor may calculate the variance of pixel values for the pixels of the newly acquired image on the basis of the calculated time average.

The variance of a pixel value for a specific pixel $(n_0, m_0)$ among the pixels of the newly acquired image may be defined by Equation (8) below.

$$\sigma_I^2(n_0, m_0, t) = \frac{1}{K}\sum_{a=1}^{K} [I(n_0, m_0, t-a) - \mu_I(n_0, m_0, t)]^2 \quad \text{Equation (8)}$$

In Equation (8), $\sigma_I^2(n_0, m_0, t)$ denotes the variance of a pixel value for a specific pixel $(n_0, m_0)$ among the pixels of a newly acquired image, $\mu I(n_0, m_0, t)$ denotes the time average of a pixel value for a specific pixel $(n_0, m_0)$ among pixels of a newly acquired image, and $I(n_0, m_0, t-a)$ denotes a pixel value for a specific pixel $(n_0, m_0)$ among pixels of an image acquired at time t-a. K may be defined as a natural number and time t may be understood as a parameter indicating the current time.

The processor may calculate the variance of the pixel value for the specific pixel $(n_0, m_0)$ using Equation (8).

For example, the processor may divide the newly acquired image into a plurality of pixels in order to analyze the newly acquired image in units of pixels. Through Equation (7), the processor may calculate the time average of a pixel value for each of the plurality of pixels resulting from division. The processor may also calculate the variance of the pixel value for each of the plurality of pixels resulting from division on the basis of the calculated time average and Equation (8). When the calculated variance of the pixel value for the seventh pixel among the plurality of pixels resulting from division is smaller than a preset threshold, the processor may determine that the seventh pixel is contaminated. This is because a small variance means a small change in the pixel value and a small change in the pixel value means unchanged permanent contamination in the corresponding pixel. On the other hand, when the calculated variance of the pixel value for the eighth pixel among the plurality of pixels resulting from division is equal to or larger than a preset threshold, the processor may determine that the eighth pixel is not contaminated.

According to the third contamination identification method, the processor may determine whether the newly acquired image is contaminated using K images acquired right before the newly acquired image was acquired.

<2> Fourth Contamination Identification Method

According to an embodiment, a blur pattern of a fingerprint image acquired through the fingerprint sensor may be distorted by a contaminant on the display (or the transparent cover located on the display) due to the characteristics of the display-integrated fingerprint sensor. In this case, the processor may detect distortion of the blur pattern generated in the acquired fingerprint image through Harr-wavelet transform.

For example, in order to grasp the blur extent in the acquired fingerprint image, the processor may transform the acquired fingerprint image into a frequency domain through Harr-wavelet transform. Further, the processor may generate a multi-image pyramid on the basis of a horizontal frequency and a vertical frequency of the fingerprint image transformed into the frequency domain. In addition, the processor may compare the generated multi-image pyramid with the acquired fingerprint image to identify the blur extent of an edge included in the acquired fingerprint image. The processor may determine whether the acquired fingerprint image is distorted or whether the acquired fingerprint image is contaminated on the basis of the identified blur extent of the edge.

The present embodiment is based on the principle that as the blur pattern of a fingerprint image is further distorted, the ratio of a high-frequency component decreases. According to the fourth contamination identification method, the processor may determine whether the acquired fingerprint image is distorted or whether the acquired fingerprint image is contaminated by analyzing a frequency distribution without consideration of a directional component in the frequency domain.

As described above, the processor may use various methods to identify the contaminant included in the acquired image. The above-described embodiments are merely examples for some of various embodiments that can be used during a process of identifying the contaminant included in the acquired image through the processor, and the technology disclosed in this document does not limit the embodiments.

In operation 810, the processor of the electronic device may acquire at least one image through a fingerprint image. For example, the processor may acquire a first image before a user's finger contacts a fingerprint acquisition area corresponding to an entire or partial area of the display. The processor may acquire a second image while the user's finger contact the fingerprint acquisition area corresponding to the entire or partial area of the display. The processor may acquire a third image after the user's finger is removed from the fingerprint acquisition area corresponding to the entire or partial area of the display.

In operation 820, the processor of the electronic device may identify at least one contaminant in at least a partial area of the display (or a transparent cover located on the display) included in at least one acquired image.

The processor may identify at least one contaminant in at least a partial area of the display (or a transparent cover located on the display) in the first image or the third image acquired in the state in which the user's finger does not contact the display. For example, the first image or the third image acquired in the state in which the user's finger does not contact the display may include at least one contaminant present on the display. The processor may identify at least one contaminant included in the first image or the third image.

The processor may identify at least one contaminant in at least a partial area of the display (or a transparent cover located on the display) in the second image, which is acquired in the state in which the user's finger contacts the display. For example, the second image, acquired in the state in which the user's finger contacts the display, may include a distorted fingerprint image. The processor may identify at least one contaminant from the distorted fingerprint image.

When at least one contaminant included in the acquired image is identified in operation 830, the processor of the electronic device may eliminate at least one contaminant included in the acquired image in operation 840. For example, the processor may modify the second image on the basis of at least one contaminant identified in the first image or the third image. The processor may modify the second image on the basis of distortion generated in the fingerprint image included in the second image.

When at least one contaminant included in the acquired image is not identified in operation 830, the processor of the electronic device may register the fingerprint image included in the acquired image as a user's fingerprint template in operation 850.

In operation 850, the processor of the electronic device may register the fingerprint image included in the acquired image or the modified image as the user's fingerprint template. The processor may store the registered fingerprint template in the memory of the electronic device.

In operation 860, the processor of the electronic device may perform user authentication on the basis of the registered fingerprint template. For example, after the user's fingerprint template is completely registered, the processor may receive a request related to user authentication. Through a process of comparing a fingerprint image included in a newly acquired image or a newly modified image with the fingerprint template stored in the memory, the processor may determine whether the fingerprint image included in the newly acquired image or the newly modified image is the user's fingerprint image.

Figure 9:
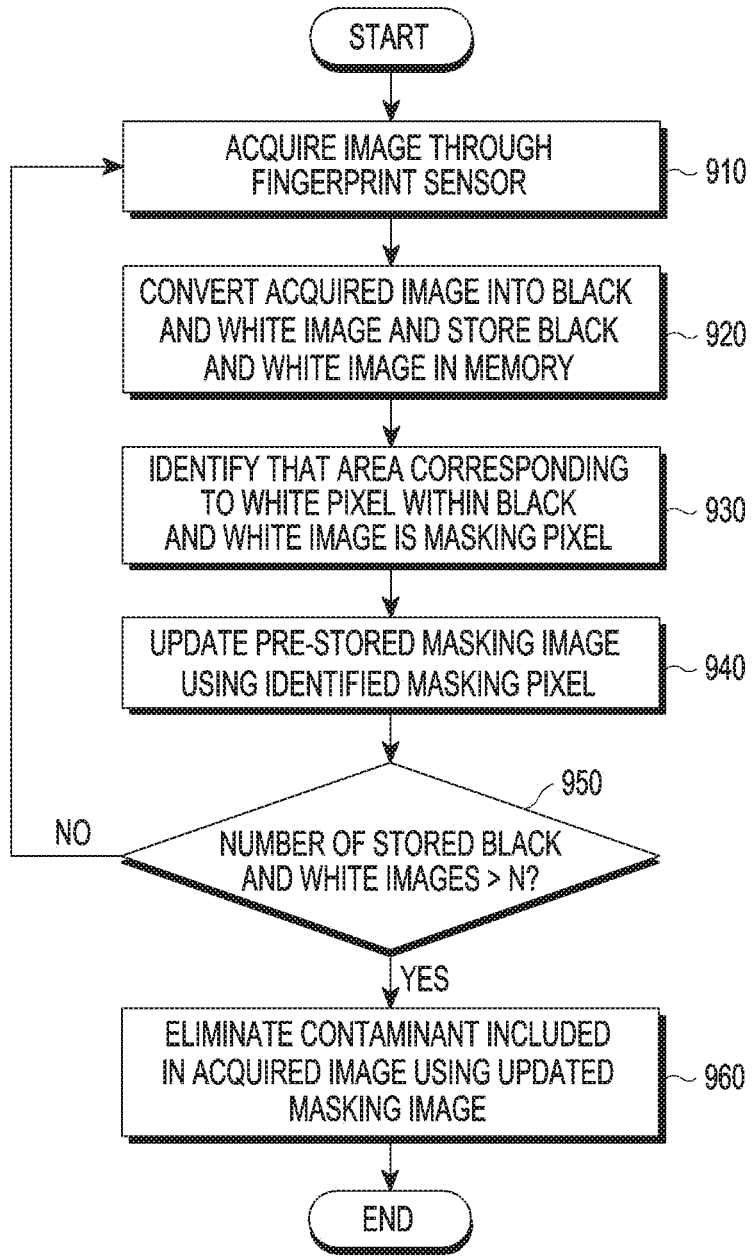
FIG. 9 is a flowchart illustrating a process of identifying a contaminant in a fingerprint acquisition area through an electronic device according to various embodiments of the disclosure.

FIG. 9 is a flowchart illustrating a process of identifying a contaminant in a fingerprint acquisition area through an electronic device according to various embodiments of the disclosure.

The electronic device according to an embodiment of the disclosure may include a display, a display-integrated fingerprint sensor, and a processor. The display-integrated fingerprint sensor (hereinafter, referred to as a fingerprint sensor) may use at least a partial area of the display (or a transparent cover located on the display) as a fingerprint acquisition area. The processor may acquire a fingerprint image having a size corresponding to that of the fingerprint acquisition area through the fingerprint sensor.

In operation 910, the processor of the electronic device may acquire at least one image through a fingerprint image. For example, the processor may acquire a first image before a user's finger contacts a fingerprint acquisition area corresponding to an entire or partial area of the display. The processor may acquire a second image while the user's finger contacts the fingerprint acquisition area corresponding to the entire or partial area of the display. The processor may acquire a third image after the user's finger is removed from the fingerprint acquisition area corresponding to the entire or partial area of the display.

According to an embodiment, in operation 910, at least one image acquired through the fingerprint sensor may be a grayscale image. The grayscale image may be an image expressed in a grayscale. For example, one pixel may have an integer value from 0 (block) to 255 (white). At this time, a color image is represented when a total of 256 integer values that one pixel may have are expressed with 256 steps of brightness and a grayscale image is represented when a total of 256 integer values that one pixel may have are expressed with 8 steps of brightness.

In operation 920, the processor may convert the acquired grayscale image into a black and white image (or a binary image) and store the converted black and white image in the memory of the electronic device.

The processor may convert the grayscale image acquired in operation 910 into a black and white image on the basis of a preset threshold value. More specifically, the processor may convert each of the pixels of the acquired grayscale image into black or white on the basis of a preset threshold value. For example, when a preset threshold value is T, each of the pixels of the acquired grayscale image may be converted into black or white on the basis of [Table 1] below. At this time, it is assumed that the acquired grayscale image is an image having N pixels in width and M pixels in length.

TABLE 1 if (ImageGray(n, m) < T)
{
    ImageBW(n, m) = 0
}else{
    ImageBW(n, m) = 1
}

In [Table 1], T is a preset threshold value, n is a natural number satisfying $1 \leq n \leq N$, and m is a natural number satisfying $1 \leq m \leq M$. ImageGray(n, m) denotes the grayscale value of the pixel that is the $n^{th}$ along a width dimension and the $m^{th}$ along a length dimension among pixels of an acquired grayscale image, and ImageBW(n, m) denotes a binary value (0 or 1) of the pixel that is the $n^{th}$ along a width dimension and the $m^{th}$ along a length dimension among pixels of a converted black and white image. For example, pixels satisfying ImageBW(n, m)=0 indicate black and pixels satisfying ImageBW(n, m)=1 indicate white.

For example, the processor may allocate the binary value 0 to a pixel having a grayscale value (ImageGray(n, m)) smaller than a preset threshold value T among pixels of the acquired grayscale image and represent the pixel in black. Further, the processor may allocate the binary value 1 to a pixel having a grayscale value (ImageGray(n, m)) equal to or larger than a preset threshold value T among pixels of the acquired grayscale image and represent the pixel in white.

More specifically, the grayscale value of a first pixel, among the pixels of the acquired grayscale image, which is smaller than a preset threshold value (ImageGray(n, m)<T) means that a part corresponding to the first pixel in the fingerprint acquisition area of the display is not transparent. The part corresponding to the first pixel in the fingerprint acquisition area of the display which is not transparent means that the corresponding part is contaminated or that the corresponding part contacts a ridge part of the fingerprint.

On the other hand, a grayscale value of a second pixel among the pixels of the acquired grayscale image that is equal to or larger than a preset threshold value (ImageGray(n, m)≥T) means that a part corresponding to the second pixel in the display acquisition area of the display is transparent. That the part corresponding to the second pixel in the fingerprint acquisition area of the display is transparent means that the corresponding part is not contaminated. Also, it means that the corresponding part faces a valley part of the fingerprint or does not contact the fingerprint.

Accordingly, the processor may determine that a black pixel, among the pixels of the converted black and white image, is a contaminated part. Further, the processor may determine that a white pixel, among the pixels of the converted black and white image, is a non-contaminated part.

In operation 930, the processor may identify that the white pixel among the pixels of the converted black and white pixels is a masking pixel. That is, the processor may identify that the pixel determined to be the non-contaminated pixel is the masking pixel. The processor may generate a masking image including identified masking pixels.

In operation 940, the processor may store the generated masking image in the memory of the electronic device. When there is a masking image pre-stored in the memory of the electronic device, the processor may update the pre-stored masking image using the masking image generated in operation 930. For example, the processor may identify non-masking pixels (pixels which are not identified as masking pixels) among the pre-stored masking image pixels.

The processor may identify masking pixels of the generated masking image. The processor may compare non-masking pixels of the pre-stored masking image with masking pixels of the generated masking image and update some of the non-masking pixels of the pre-stored masking image to be masking pixels.

In operation 950, the processor may determine whether the number of black and white images stored in operation 920 exceeds N. N is a preset threshold value, and the processor may more accurately identify the contaminant when N is larger. More specifically, as the masking image is updated on the basis of a larger number of black and white images, the processor may more accurately identify the contaminated part in the fingerprint acquisition area. For example, as the number of grayscale images acquired through the fingerprint sensor and black and white images generated by converting the acquired grayscale images is larger, a larger number of updates may be performed in operation 940. As a larger number of updates is performed in operation 940, the number of non-masking pixels of the pre-stored masking image may be reduced. In other words, as the number of non-masking pixels is reduced, the masking image may be more delicate.

According to an embodiment, the processor may acquire a plurality of grayscale images through the fingerprint sensor. The processor may convert a plurality of acquired grayscale images into a plurality of black and white images. The processor may identify a plurality of masking pixels from each of the plurality of converted black and white images. The processor may generate a plurality of masking images using the plurality of identified masking pixels. The processor may update the pre-stored masking image using the plurality of generated masking images. The processor may identify the contaminated pixel using the pre-stored masking image that has been sufficiently updated.

N may be changed according to a user setting and the processor may more accurately identify the contaminated pixel as N is larger.

In operation 960, the processor may identify the contaminant included in the image or the fingerprint acquisition area acquired through the fingerprint sensor on the basis of the updated masking image. The processor may eliminate the contaminant included in the image acquired through the fingerprint sensor on the basis of the identified contaminant.

Figure 10:
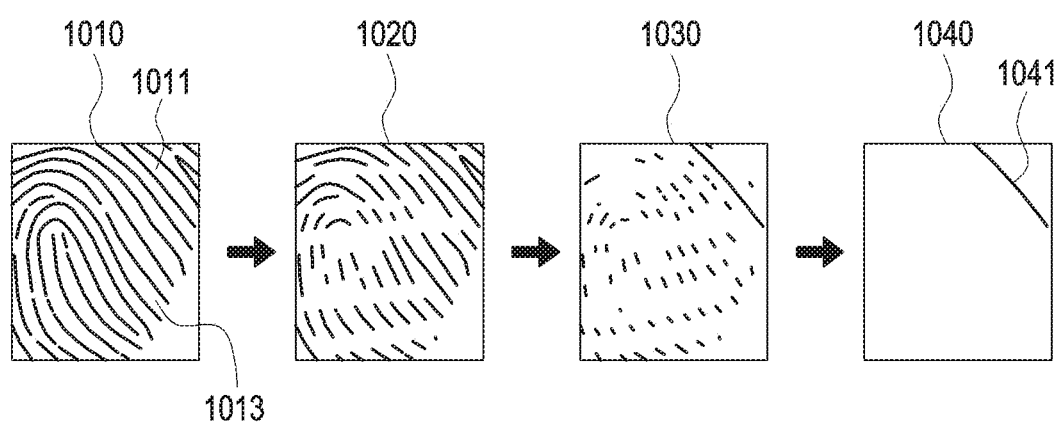
FIG. 10 illustrates a method of identifying a contaminant using a masking image according to various embodiments of the disclosure.

FIG. 10 illustrates a method of identifying a contaminant using a masking image according to various embodiments of the disclosure.

In FIG. 10, a first fingerprint image 1010, a second fingerprint image 1020, a third fingerprint image 1030, and a fourth fingerprint image 1040 are illustrated. The processor may acquire the second to fourth fingerprint images 1020, 1030, and 1040 on the basis of the masking image stored in the memory and the first fingerprint image 1010.

The first fingerprint image 1010 may include a first part 1011 displayed in black and a second part 1013 displayed in white. The first part 1011 is an area corresponding to pixels having a grayscale value (ImageGray(n, m)) smaller than a preset threshold value T among pixels of the grayscale image acquired through the fingerprint sensor. The first part 1011 is an area satisfying ImageGray(n, m)<T and a part having a high possibility of having the contaminant identified therein. The second part 1013 is an area corresponding to pixels having a grayscale value (ImageGray(n, m)) equal to or larger than a preset threshold value T among pixels of the grayscale image acquired through the fingerprint sensor. The second part 1013 is an area satisfying ImageGray(n, m)≥T and a part having a low possibility of having the contaminant identified therein.

The second fingerprint image 1020 is an image generated by masking some of the pixels of the first fingerprint image 1010 on the basis of a first masking image stored in the memory. In other words, the part displayed in white in the second fingerprint image 1020 is a union of the part (second part 1013) displayed in white in the first fingerprint image 1010 and a part corresponding to masking pixels of the first masking image stored in the memory.

The processor may acquire a second masking image by updating the first masking image stored in the memory. The third fingerprint image 1030 is generated by masking some of the pixels of the second fingerprint image 1020 on the basis of the updated second masking image. In other words, the part displayed in white in the third fingerprint image 1030 is a union of the part displayed in white in the second fingerprint image 1020 and a part corresponding to masking pixels of the updated second masking image.

The processor may acquire a third masking image by updating the second masking image stored in the memory. The fourth fingerprint image 1040 is generated by masking some of the pixels of the third fingerprint image 1030 on the basis of the updated third masking image. In other words, the part displayed in white in the fourth fingerprint image 1040 is a union of the part displayed in white in the third fingerprint image 1030 and a part corresponding to masking pixels of the updated third masking image.

When it is assumed that the third masking image is a sufficiently updated masking image, a third part 1041 displayed in black included in the fourth fingerprint image 1040 is a part that has not been masked to the end, and the processor may identify that the third part 1041 is a contaminated part.

For example, when it is assumed that there is a scratch such as the third part 1041 in the fingerprint acquisition area of the display (or the transparent cover located on the display), a plurality of fingerprint images acquired through the fingerprint acquisition area may include the contaminant, like the third part 1041. If the embodiment of FIG. 9 is implemented using the plurality of acquired fingerprint images, the processor may acquire the third masking image like the fourth fingerprint image 1040 in operation 960. The parts displayed in white in the third masking image are masking pixels and the parts displayed in black are non-masking pixels. The processor may mask pixels of the first to third fingerprint images 1010, 1020, and 1030 on the basis of the masking pixels of the third masking image, and, as a result, may acquire the fourth fingerprint image 1040.

According to an embodiment, the sufficiently updated masking image and the fingerprint image masked using the sufficiently updated masking image may have the same shape (for example, 1040).

Figure 11:
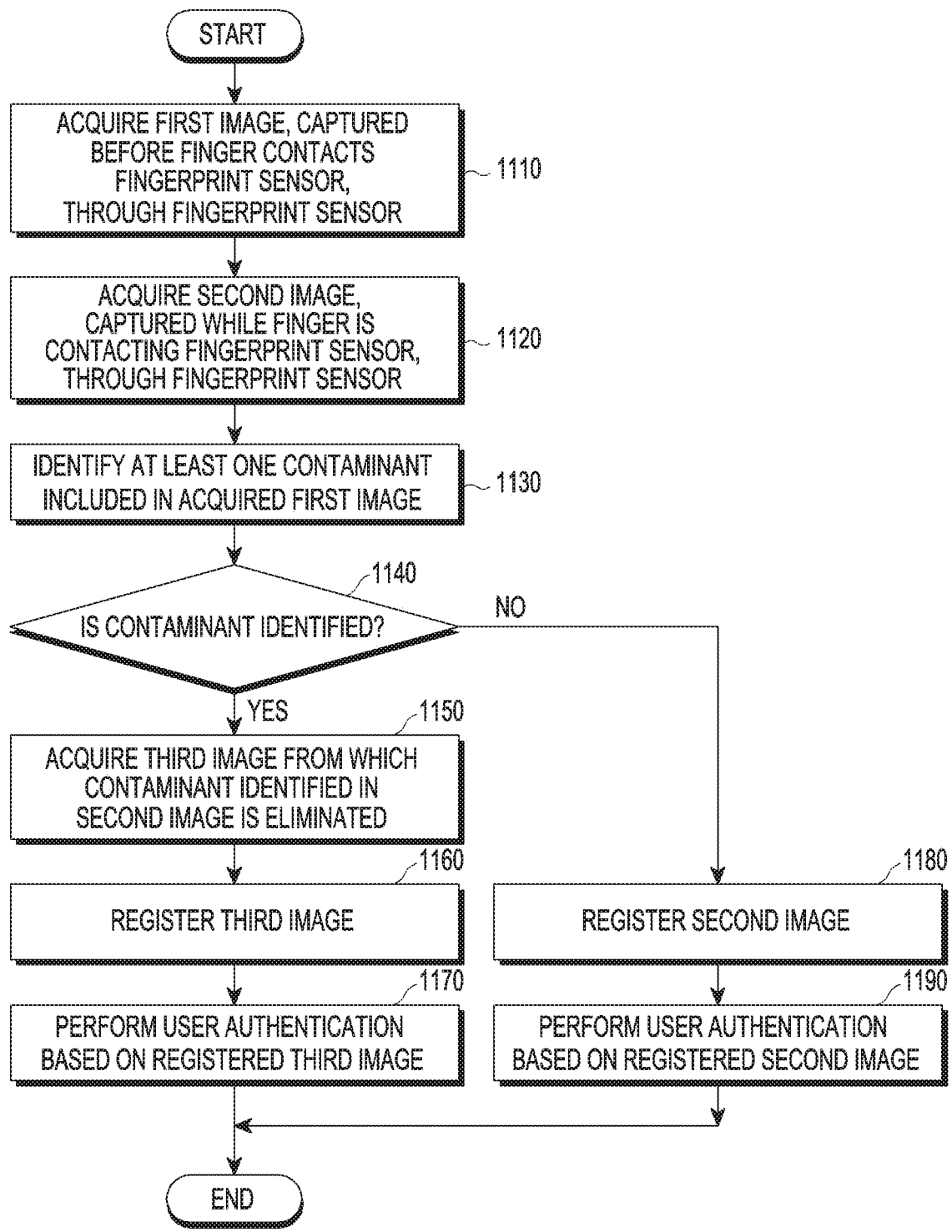
FIG. 11 is a flowchart illustrating a process of processing a contaminant included in a fingerprint image and registering the fingerprint image through an electronic device according to various embodiments of the disclosure.

FIG. 11 is a flowchart illustrating a process of processing a contaminant included in a fingerprint image and registering the fingerprint image through an electronic device according to various embodiments of the disclosure.

In operation 1110, the processor may acquire a first image captured through a fingerprint sensor before a user's finger contacts a fingerprint acquisition area corresponding to an entire or partial area of the display.

In operation 1120, the processor may acquire a second image captured through the fingerprint sensor while the user's finger is contacting the fingerprint acquisition area corresponding to the entire or partial area of the display.

In operation 1130, the processor may identify at least one contaminant included in the acquired first image. A method of identifying at least one contaminant included in the acquired first image may include the first to fourth contamination identification methods according to the embodiment of FIG. 8 or a contamination identification method according to the embodiment of FIG. 9.

When at least one contaminant is identified in the acquired first image in operation 1140, the processor may determine that at least one contaminant identified through the first image is also included in the second image in operation 1150. For example, at least one contaminant identified through the first image is included in the first image captured through the fingerprint sensor before the user's finger contacts the fingerprint acquisition area corresponding to the entire or partial area of the display, and thus it is highly likely that at least one identified contaminant is a contaminant existing in the fingerprint acquisition area. A contaminant existing in the fingerprint acquisition area may also be included in the second image acquired through the fingerprint sensor while the user's finger is contacting the fingerprint acquisition area corresponding to the entire or partial area of the display.

The processor may acquire a third image from which at least one contaminant included in the second image is eliminated using at least one contaminant identified through the first image. For example, the second image is captured through the fingerprint sensor while the user's finger is contacting the fingerprint acquisition area corresponding to the entire or partial area of the display and may include both the user's fingerprint image and at least one contaminant. The processor may eliminate only at least one contaminant among the user's fingerprint image and the at least one contaminant included in the second image using the at least one contaminant identified through the first image.

In operation 1160, the processor may register a fingerprint image included in the acquired third image as a user's fingerprint template. The processor may store the registered fingerprint template in the memory of the electronic device.

In operation 1170, the processor may perform user authentication on the basis of the registered fingerprint template. For example, after the user's fingerprint template is completely registered, the processor may receive a request related to user authentication. Through a process of comparing a fingerprint image included in a newly acquired image or a newly modified image with the fingerprint template stored in the memory, the processor may determine whether the fingerprint image included in the newly acquired image or the newly modified image is the user's fingerprint image.

When at least one contaminant is not identified in the acquired first image in operation 1140, the processor may determine that the second image also does not include any contamination in operation 1180. The processor may register the fingerprint image included in the acquired second image as a user's fingerprint template. The processor may store the registered fingerprint template in the memory of the electronic device.

In operation 1190, the processor may perform user authentication on the basis of the registered fingerprint template. For example, after the user's fingerprint template is completely registered, the processor may receive a request related to user authentication. Through a process of comparing a fingerprint image included in a newly acquired image or a newly modified image with the fingerprint template stored in the memory, the processor may determine whether the fingerprint image included in the newly acquired image or the newly modified image is the user's fingerprint image.

In the embodiment, the image captured through the fingerprint sensor before the user's finger contacts the fingerprint acquisition area corresponding to the entire or partial area of the display is used as the first image, but the processor may use the image captured through the fingerprint sensor after the user's finger contacting the fingerprint acquisition area corresponding to the entire or partial area of the display is removed therefrom, as in the first image.

Figure 12:
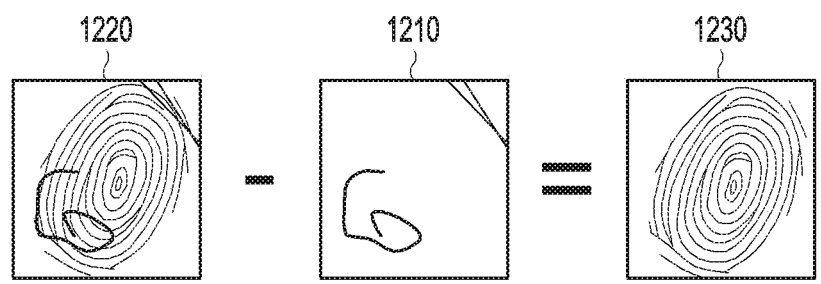
FIG. 12 illustrates a process of processing a contaminant included in a fingerprint image through an electronic device according to various embodiments of the disclosure.

FIG. 12 illustrates a process of processing contamination included in a fingerprint image through an electronic device according to various embodiments of the disclosure.

The electronic device according to an embodiment of the disclosure may include a display, a display-integrated fingerprint sensor, and a processor. The display-integrated fingerprint sensor (hereinafter, referred to as a fingerprint sensor) may use at least a partial area of the display (or a transparent cover located on the display) as a fingerprint acquisition area. The processor may acquire a fingerprint image having a size corresponding to the fingerprint acquisition area through the fingerprint sensor.

The processor may acquire at least one image through the fingerprint sensor. For example, the processor may acquire a first image through the fingerprint sensor before the user's finger contacts the fingerprint acquisition area corresponding to an entire or partial area of the display. The processor may acquire a second image through the fingerprint sensor while the user's finger is contacting the fingerprint acquisition area corresponding to an entire or partial area of the display. The processor may acquire a third image through the fingerprint sensor after the user's finger, contacting the fingerprint acquisition area corresponding to an entire or partial area of the display, is removed therefrom.

According to an embodiment, the processor may acquire an image 1210 as the first image or the third image. The processor may acquire an image 1220 as the second image. For example, the first image or the third image may not include a fingerprint image since the first image and the third image are images acquired in the state in which the user's finger does not contact the fingerprint acquisition area corresponding to an entire or partial area of the display. The second image may include a fingerprint image since the second image is an image acquired through the fingerprint sensor while the user's finger is contacting the fingerprint acquisition area corresponding to an entire or partial area of the display.

The processor may eliminate at least one contaminant included in the image 1220 on the basis of at least one contaminant included in the image 1210. The processor may acquire an image 1230 from which at least one contaminant is eliminated. For example, the processor may eliminate pixels corresponding to at least one contaminant included in the image 1220 by subtracting the image 1210 from the image 1220.

Figure 13:
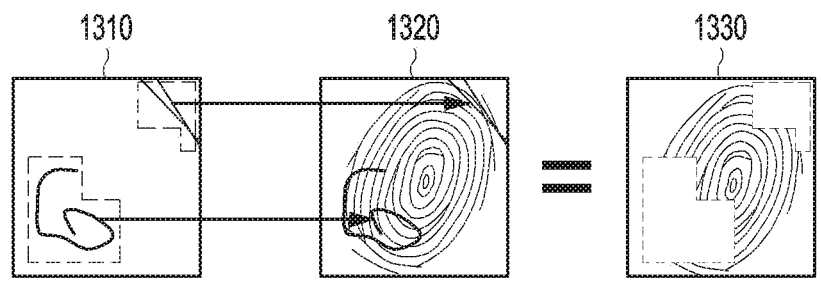
FIG. 13 illustrates a process of masking a contaminant included in a fingerprint image through an electronic device according to various embodiments of the disclosure.

FIG. 13 illustrates a process of masking a contaminant included in a fingerprint image through an electronic device according to various embodiments of the disclosure.

The electronic device according to an embodiment of the disclosure may include a display, a display-integrated fingerprint sensor, and a processor. The display-integrated fingerprint sensor (hereinafter, referred to as a fingerprint sensor) may use at least a partial area of the display (or a transparent cover located on the display) as a fingerprint acquisition area. The processor may acquire a fingerprint image having a size corresponding to the fingerprint acquisition area through the fingerprint sensor.

The processor may acquire at least one image through the fingerprint sensor. For example, the processor may acquire a first image through the fingerprint sensor before the user's finger contacts the fingerprint acquisition area corresponding to an entire or partial area of the display. The processor may acquire a second image through the fingerprint sensor while the user's finger is contacting the fingerprint acquisition area corresponding to an entire or partial area of the display. The processor may acquire a third image through the fingerprint sensor after the user's finger, contacting the fingerprint acquisition area corresponding to an entire or partial area of the display, is removed therefrom.

According to an embodiment, the processor may acquire an image 1310 as the first image or the third image. The processor may acquire an image 1320 as the second image. For example, the first image or the third image may not include a fingerprint image since the first image and the third image are images acquired in the state in which the user's finger does not contact the fingerprint acquisition area corresponding to an entire or partial area of the display. The second image may include a fingerprint image since the second image is an image acquired through the fingerprint sensor while the user's finger is contacting the fingerprint acquisition area corresponding to an entire or partial area of the display.

The processor may eliminate at least one contaminant included in the image 1320 on the basis of at least one contaminant included in the image 1310. For example, the processor may identify a part corresponding to at least one contaminant identified through the image 1310 as a masking pixel. The processor may eliminate the part corresponding to at least one contaminant included in the image 1320 using the masking pixel of the identified image 1310. The processor may acquire an image 1330 in which at least one contaminant is masked.

Figure 14A:
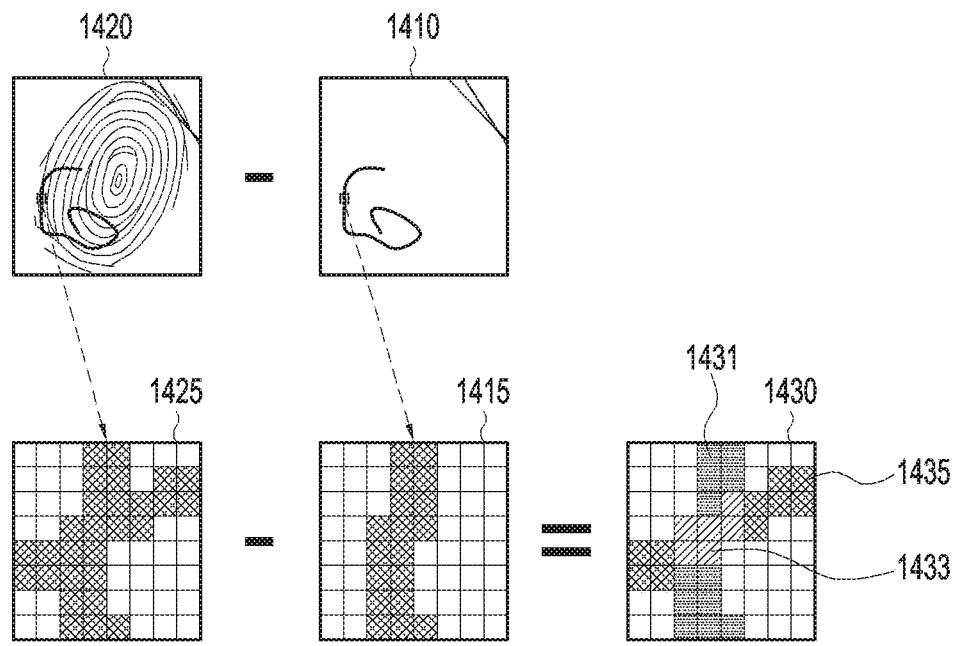
FIGS. 14A to 14C illustrate a process of processing a contaminant included in a fingerprint image and a process of identifying a lost part through an electronic device according to various embodiments of the disclosure.
Figure 14B:
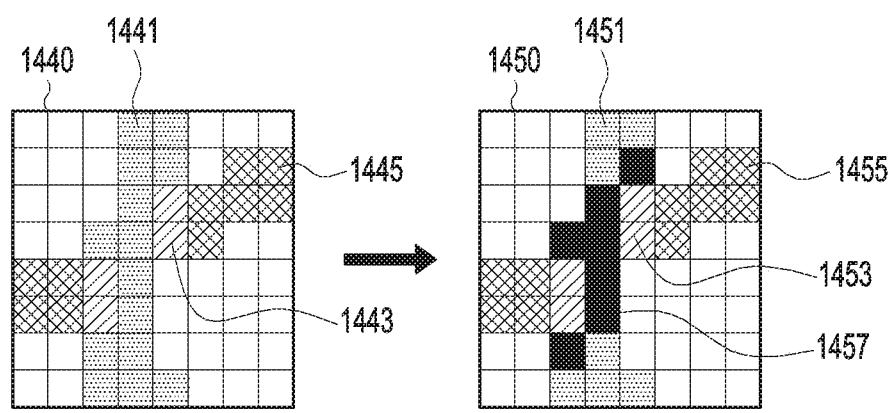
Figure 14C:
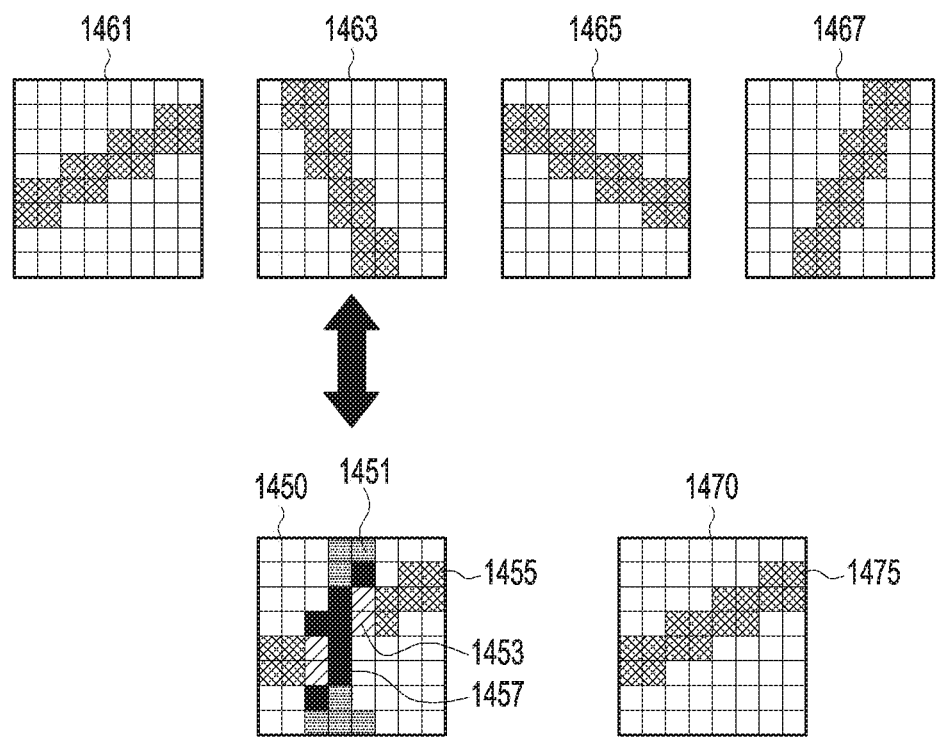

FIGS. 14A to 14C illustrate a process of processing a contaminant included in a fingerprint image and a process of identifying a lost part through an electronic device according to various embodiments of the disclosure.

FIG. 14A illustrates a process of processing a contaminant included in a fingerprint image through an electronic device according to various embodiments of the disclosure.

The electronic device according to an embodiment of the disclosure may include a display, a display-integrated fingerprint sensor, and a processor. The display-integrated fingerprint sensor (hereinafter, referred to as a fingerprint sensor) may use at least a partial area of the display (or a transparent cover located on the display) as a fingerprint acquisition area. The processor may acquire a fingerprint image having a size corresponding to the fingerprint acquisition area through the fingerprint sensor.

The processor may acquire at least one image through the fingerprint sensor. For example, the processor may acquire a first image through the fingerprint sensor before the user's finger contacts the fingerprint acquisition area corresponding to an entire or partial area of the display. The processor may acquire a second image through the fingerprint sensor while the user's finger is contacting the fingerprint acquisition area corresponding to an entire or partial area of the display. The processor may acquire a third image through the fingerprint sensor after the user's finger, contacting the fingerprint acquisition area corresponding to an entire or partial area of the display, is removed therefrom.

According to an embodiment, the processor may acquire an image 1410 as the first image or the third image. The processor may acquire an image 1420 as the second image. For example, the first image or the third image may not include a fingerprint image since the first image and the third image are images acquired in the state in which the user's finger does not contact the fingerprint acquisition area corresponding to an entire or partial area of the display. The second image may include a fingerprint image, since the second image is an image acquired through the fingerprint sensor while the user's finger is contacting the fingerprint acquisition area corresponding to an entire or partial area of the display.

By enlarging a part corresponding to at least one contaminant included in the image 1410, it may be noted that the part corresponding to at least one contaminant includes contaminated pixels, like the image 1415. Further, by enlarging parts corresponding to at least one contaminant and the fingerprint image included in the image 1420, it may be noted that the parts corresponding to at least one contaminant and the fingerprint image include contaminated pixels and pixels of the fingerprint image, like the image 1425. At this time, the contaminated pixels may be divided into pixels included in the fingerprint image and pixels that are not included in the fingerprint image. For example, as in the embodiment of FIG. 12, the processor may acquire an image 1430 from which pixels corresponding to at least one contaminant included in the image 1425 are eliminated by subtracting the image 1415 from the image 1425. The image 1430 acquired through the subtraction operation may include only pixels 1435 that are not contaminated, among the pixels included in the fingerprint image. Contaminated pixels 1431 and 1433 eliminated through the subtraction operation may include pixels 1431 that are not included in the fingerprint image and pixels 1433 included in the fingerprint image.

FIG. 14B illustrates a process of identifying a lost part during the process of processing a contaminant included in the fingerprint image through the electronic device according to various embodiments of the disclosure.

According to an embodiment, the processor may determine that pixels 1433 included in the fingerprint image among the contaminated pixels 1431 and 1433 eliminated through the subtraction operation are parts lost during the process of processing the contaminant.

By enlarging parts corresponding to at least one contaminant included in the image 1420 and the fingerprint image, it may be noted that, through an image 1440, the part corresponding to at least one contaminant includes the contaminated pixels 1441 and 1443 and the part corresponding to the fingerprint image includes pixels 1445 that are not contaminated. The processor may determine that it is highly likely that pixels 1443 contacting pixels 1445 that are not contaminated among contaminated pixels 1441 and 1443 are pixels included in the fingerprint image. In other words, when the pixels 1443 contacting the pixels 1445 that are not contaminated among contaminated pixels 1441 and 1443 are eliminated, the processor may determine that the pixels included in the fingerprint image may be lost. The processor may additionally perform an operation of performing compensation after eliminating the pixels 1443 contacting the pixels 1445 that are not contaminated, among the contaminated pixels 1441 and 1443.

An image 1450 includes pixels generated by subdividing the contaminated pixels 1441 and 1443 in the image 1440. More specifically, the processor may divide contaminated pixels into completely contaminated first pixels 1451, second pixels 1453 contacting non-contaminated pixels 1455, and third pixels 1457 contacting the second pixels 1453. The processor may determine that it is highly likely that the second pixels 1453 contacting the non-contaminated pixels 1455 are pixels included in the fingerprint image. Further, the processor may determine that it is highly likely that the third pixels 1457 contacting the second pixels 1453 are pixels included in the fingerprint image. In other words, the third pixels 1453 have a relatively lower possibility of being pixels included in the fingerprint image than the second pixels but are, probabilistically, highly likely to be pixels included in the fingerprint image.

The processor may identify that the second pixels 1453 or the third pixels 1453 are parts lost during the process of processing the contaminant included in the fingerprint image. The processor may additionally perform an operation of compensating for the parts identified to be lost.

FIG. 14C illustrates a method of using a reference pattern during the process of identifying the lost part through the electronic device according to various embodiments of the disclosure.

The processor may define a reference pattern used for identifying the lost part during the process of processing the contaminant included in the fingerprint image and compensating for the identified part. For example, the reference pattern may be linear- or curved-type repetitive pattern information extracted from pixels included in the fingerprint image. The reference pattern may be pattern information repeated in a specific form, like the image 1461, the image 1463, the image 1465, and the image 1467.

The image 1450 may include completely contaminated first pixels 1451, second pixels 1453 contacting non-contaminated pixels 1455, third pixels 1457 contacting the second pixels 1453, and non-contaminated fourth pixels 1455. The processor may determine whether pattern information related to the reference pattern exists in the image 1450 on the basis of the second pixels 1453 contacting the non-contaminated pixels 1455, the third pixels 1457 contacting the second pixels 1453, and the fourth pixels 1455. For example, the processor may acquire the image 1470 including pattern information 1475 related to the defined reference pattern by determining whether there is pattern information related to the reference pattern in the image 1450.

Figure 15A:
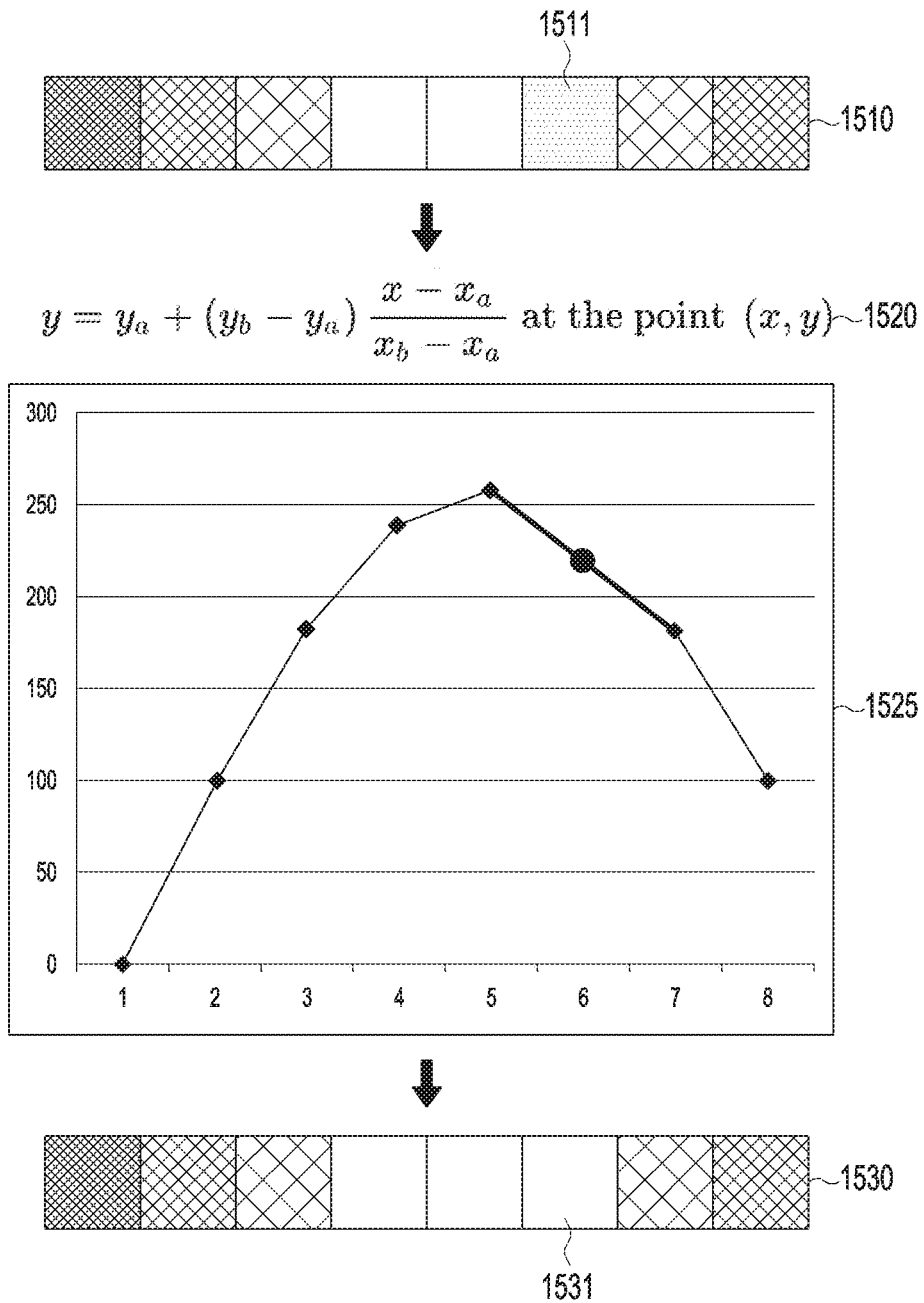
FIGS. 15A to 15B illustrate a process of compensating for the lost part in the fingerprint image through the electronic device according to various embodiments of the disclosure.
Figure 15B:
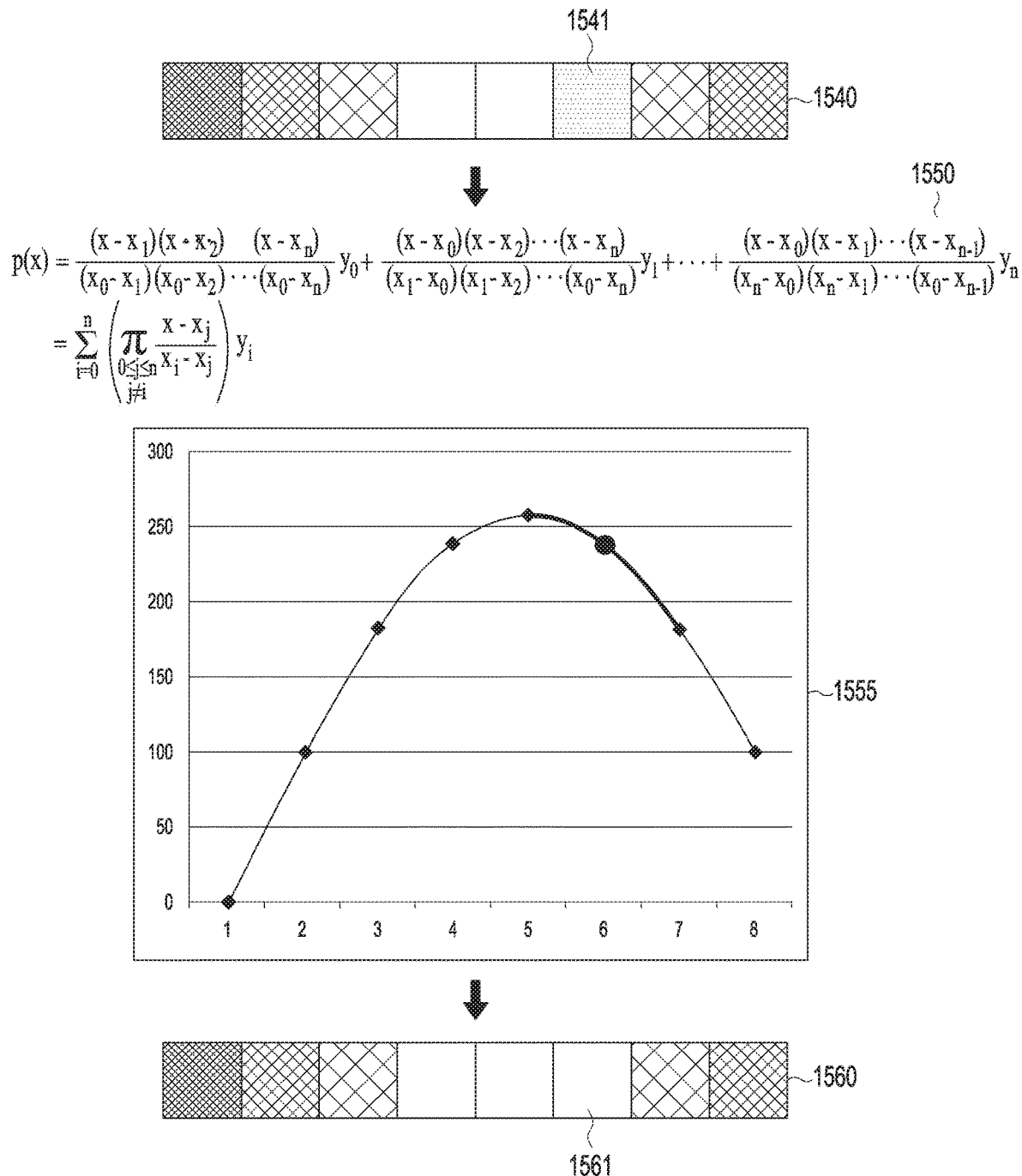

FIGS. 15A to 15B illustrate a process of compensating for the lost part in the fingerprint image through the electronic device according to various embodiments of the disclosure.

According to an embodiment, the processor may compensate for the lost part during the process of processing the contaminant included in the fingerprint image. For example, the processor may perform interpolation on the basis of pixel values of pixels adjacent to the lost pixels. When it is assumed that the pixel values of the adjacent pixels satisfy the linear relation, the processor may generate a linear function for the pixel values of the adjacent pixels. When the pixel values of the adjacent pixels do not satisfy the linear relation, the processor may generate an $n^{th}$-order polynomial for the pixel values of the adjacent pixels. The processor may estimate pixel values of the lost pixels through the generated linear function or the generated $n^{th}$-order polynomial.

In FIG. 15A, pixels 1510 before interpolation is performed and pixels 1530 after interpolation is performed are illustrated. A first pixel 1511 of the pixels 1510 before interpolation is performed is a pixel lost during the process of processing the contaminant included in the fingerprint image. The processor may identify that the first pixel 1511 of the pixels 1510 before interpolation is the pixel lost during the process of processing the contaminant. The processor may generate a linear function 1520 on the basis of pixel values of pixels adjacent to the first pixel 1511 identified as being lost. Referring to the graph 1525, the processor may estimate the pixel value of the lost first pixel 1511 (a sixth pixel in the graph) through the linear function 1520. The processor may display a second pixel 1531 using the estimated pixel value.

In FIG. 15B, pixels 1540 before interpolation is performed and pixels 1560 after interpolation is performed are illustrated. A third pixel 1541 of the pixels 1540 before interpolation is performed is a pixel lost during the process of processing the contaminant included in the fingerprint image. The processor may identify that the first pixel 1541 of the pixels 1540 before interpolation is the pixel lost during the process of processing the contaminant. The processor may generate an $n^{th}$-order polynomial 1550 on the basis of pixel values of pixels adjacent to the third pixel 1541 identified to be lost. Referring to a graph 1555, the processor may estimate the pixel value of the lost third pixel 1541 (a sixth pixel in the graph) using the $n^{th}$-order polynomial 1550 The processor may display a fourth pixel 1561 using the estimated pixel value.

The pixel value of the fourth pixel 1561 estimated through the $n^{th}$-order polynomial may be more accurate than the pixel value of the second pixel 1531 estimated through the linear function.

Figure 16A:
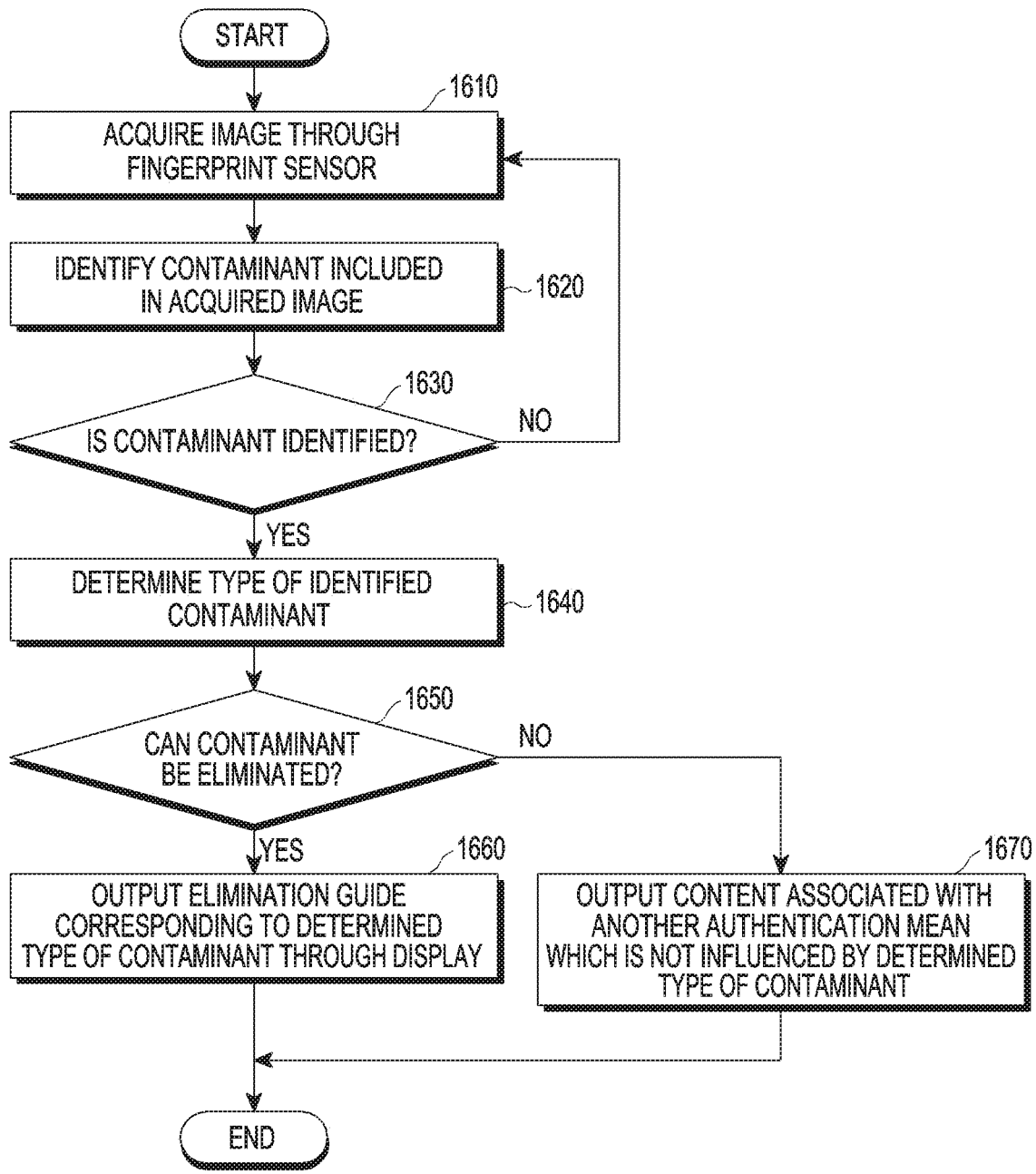
FIGS. 16A to 16B illustrate a method of outputting a guide to eliminate a contaminant included in a fingerprint image and content related to another authentication means through an electronic device according to various embodiments of the disclosure.
Figure 16B:
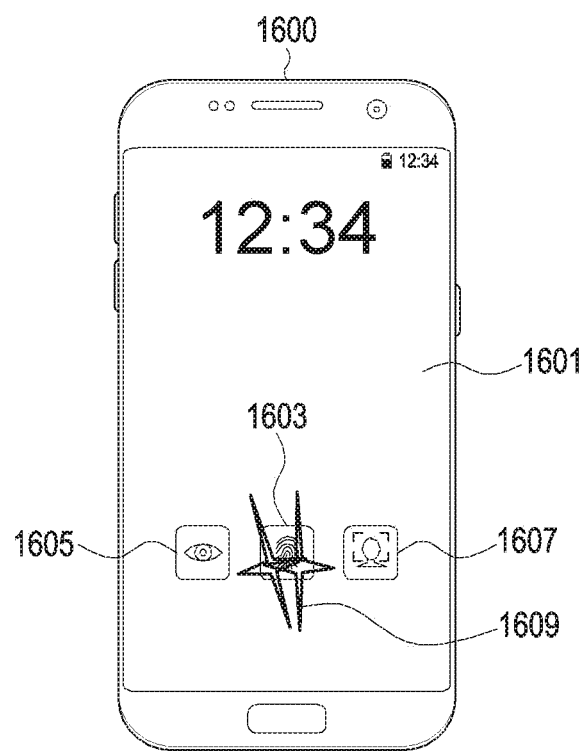

FIGS. 16A to 16B illustrate a method of outputting a guide to eliminate a contaminant included in a fingerprint image and content related to another authentication means through an electronic device according to various embodiments of the disclosure.

Referring to FIG. 16A, the processor may control the electronic device to output the guide to eliminate the contaminant included in the fingerprint image or output content related to another authentication method.

In operation 1610, the processor may acquire at least one image through the fingerprint sensor. For example, the processor may acquire a first image through the fingerprint sensor before the user's finger contacts the fingerprint acquisition area corresponding to an entire or partial area of the display. The processor may acquire a second image through the fingerprint sensor while the user's finger is contacting the fingerprint acquisition area corresponding to an entire or partial area of the display. The processor may acquire a third image through the fingerprint sensor after the user's finger contacting the fingerprint acquisition area corresponding to an entire or partial area of the display is removed therefrom.

In operation 1620, the processor may identify the contaminant included in at least one acquired image. The processor may identify the contaminant in at least a partial area of the display (or a transparent cover located on the display) in the first image or the third image, acquired in the state in which the user's finger does not contact the display. For example, the first image or the third image, acquired in the state in which the user's finger does not contact the display, may include a contaminant existing on the display. The processor may identify the contaminant included in the first image or the third image.

The processor may identify the contaminant in at least a partial area of the display (or a transparent cover located on the display) in the second image, acquired in the state in which the user's finger contacts the display. For example, the second image, acquired in the state in which the user's finger contacts the display, may include a distorted fingerprint image. The processor may identify the contaminant from the distorted fingerprint image.

When the contaminant is identified in the acquired image in operation 1630, the processor may determine the type of the contaminant included in the acquired image in operation 1640. The processor may determine the type of the contaminant on the basis of a pattern of the contaminant included in the acquired image or the size of the contaminated area. For example, when it is determined that the contaminant has a linear or net pattern, the processor may determine that a scratch or crack is formed in the fingerprint acquisition area. When it is determined that the contaminant has a circular or oval pattern or has an area larger than or equal to a predetermined size, the processor may determine that the fingerprint acquisition area is stained with dirt or a water drop is formed thereon.

In operation 1650, the processor may determine whether the contaminant can be eliminated on the basis of the determined type of contaminant. For example, when it is determined that a scratch or crack is formed in the fingerprint acquisition area, the processor may determine that it is a contaminant that can be eliminated. Further, when it is determined that the fingerprint acquisition area is stained with dirt or that a water drop is formed thereon, the processor may determine that it is a contaminant that can be eliminated.

When it is determined that the identified contaminant can be eliminated, the processor may output an elimination guide corresponding to the determined type of the contaminant through the display in operation 1660. For example, when it is determined that the fingerprint acquisition area is stained with dirt or a water drop is formed thereon, the processor may output content for guiding the user to wipe off the dirt or dry the water drop on the fingerprint acquisition area through the display.

When it is determined that the identified contaminant cannot be eliminated, the processor may output content related to another authentication means which is not influenced by the determined type of the contaminant in operation 1670. For example, referring to FIG. 16B, an electronic device 1600 may include a display 1601. The display 1601 may include a fingerprint acquisition area 1603. The electronic device may acquire a fingerprint image through the fingerprint acquisition area 1603 and include a means for user authentication through iris recognition 1605 or face recognition 1607. When it is determined that there is a contaminant 1609 that cannot be eliminated, such as a scratch or crack on the display (or a transparent cover located on the display), the processor may perform user authentication through another authentication means which is not influenced by the contaminant 1609 that cannot be eliminated. When there is the contaminant 1609 that cannot be eliminated in the fingerprint acquisition area 1603 and thus user authentication through the fingerprint sensor is not possible, the process may perform user authentication through an authentication means which is unaffected by the contaminant 1609 that cannot be eliminated, such as iris recognition 1605, face recognition 1607, or password input.

When it is determined that the identified contaminant cannot be eliminated, the processor may output content corresponding to a solution thereof through the display. For example, when there is a scratch or crack in the fingerprint acquisition area 1603, the processor may output content guiding the user to change the display. The processor may provide information on service centers that can change the display.

Figure 17:
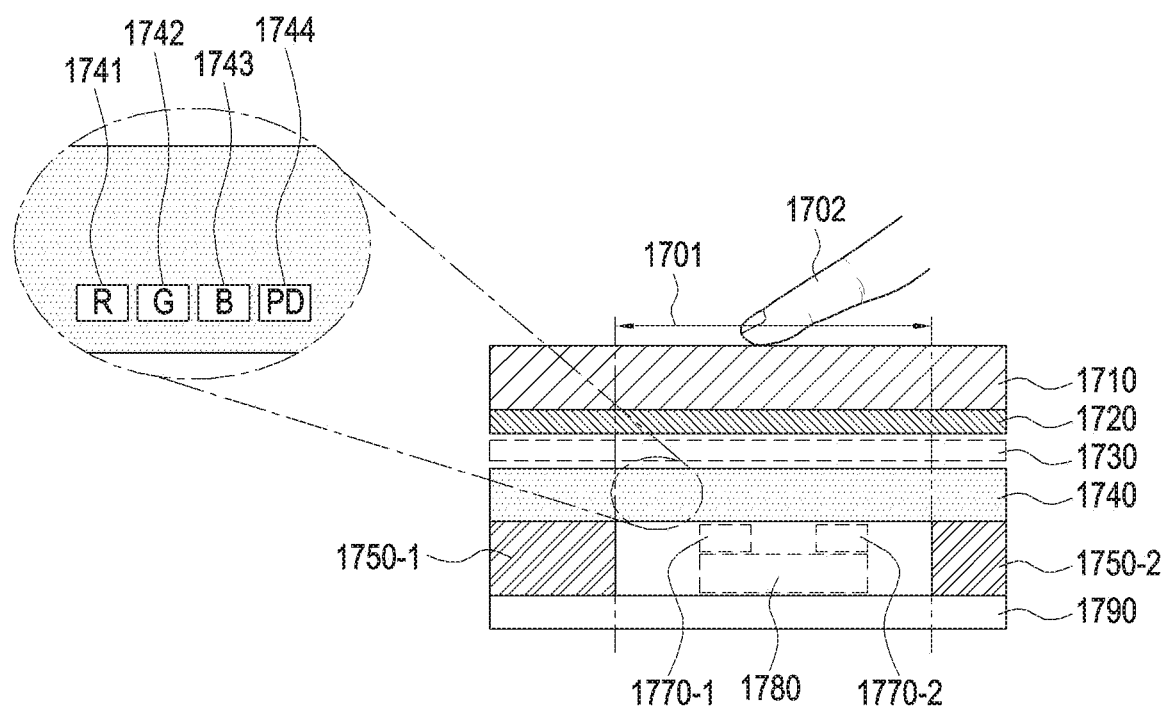
FIG. 17 is a side view of an electronic device according to various embodiments of the disclosure.

FIG. 17 is a side view of an electronic device according to various embodiments of the disclosure.

As illustrated in FIG. 17, an electronic device (for example, the electronic device 101 or 201) according to an embodiment may include a biometric sensor for detecting user's biometric information in at least a partial area of a display 1740 (for example, the display 160 or 260).

According to an embodiment, the electronic device may include a transparent cover 1710, a fingerprint sensor 1730, 1744, or 1780, a display 1740, or a Printed Circuit Board (PCB) 1790.

According to an embodiment, the transparent cover 1710 may adhere to the fingerprint sensor 1730 or the display 1740 through an adhesive layer 1720. According to an embodiment, the electronic device may further include structures 1750-1 and 1750-2 for securing a mounting space of the fingerprint sensor 1780. For example, the structures 1750-1 and 1750-2 may form at least a portion of the sealing structure for protecting the fingerprint sensor 1780.

According to an embodiment, the fingerprint sensor 1730, 1744, or 1780 may be formed in a partial area of the display 1740 (for example, one area or a plurality of areas) or an entire area of the display (for example, an active area of the display).

According to an embodiment, the fingerprint sensor 1730 or 1744 for detecting user's fingerprint information may be formed on one surface (for example, an upper surface) of the display (for example, a separate layer 1730 on one surface of the display or at least a partial area of the surface on which pixels 1741 to 1743 of the display are formed).

According to an embodiment, the fingerprint sensor 1780 for detecting user's fingerprint information may be formed on the other surface (for example, the rear surface) of the display. For example, the fingerprint sensor 1730, 1744, or 1780 may include an optical image sensor, a capacitive transmission/reception electrode pattern, or an ultrasound transmission/reception module.

According to an embodiment, the fingerprint sensor 1730 may be formed between the adhesive layer 1720 and the display 1740 or between the transparent cover 1710 and the adhesive layer 1720. For example, the fingerprint sensor 1730 may be formed in the capacitive transmission/reception electrode pattern, and may be formed with a transparent electrode in order to increase the permeability of light output from the display 1740. For example, the fingerprint sensor 1730 may also include the optical image sensor or the ultrasound transmission/reception module.

According to an embodiment, the fingerprint sensor 1780 may be formed on the other surface (for example, the rear surface) of the display. For example, elastic bodies 1770-1 and 1770-2 (for example, sponge or rubber) for mitigating the impact between the fingerprint sensor 1780 and the display 1740 and preventing foreign materials from flowing in may be formed between the fingerprint sensor 1780 and the display 1740. For example, the fingerprint sensor 1780 may include the optical image sensor. For example, the image sensor may radiate light (for example, visible light, infrared radiation, or ultraviolet radiation) emitted from a light source (for example, the display 1740 or an infrared LED) to the user's fingerprint and detect light reflected from the user's fingerprint.

Figure 18:
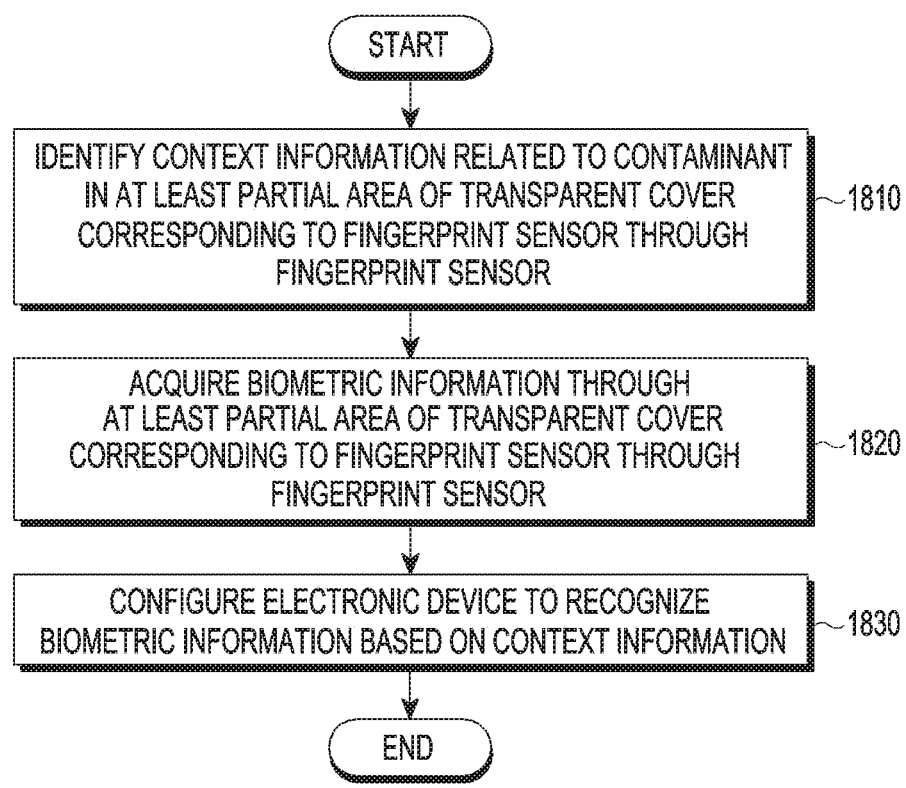
FIG. 18 illustrates a method of acquiring biometric information through an electronic device according to various embodiments of the disclosure.

FIG. 18 illustrates a method of acquiring biometric information through an electronic device according to various embodiments of the disclosure.

The electronic device according to an embodiment may include a housing, a transparent member configured to form at least a portion of the external surface of the electronic device and disposed in at least a portion of the housing; a display, at least a portion of which is housed in the housing, and which is disposed in at least a partial area of the transparent member; a fingerprint sensor formed in at least a partial area of the display; and a processor connected to the display and the fingerprint sensor.

In operation 1810, the processor may identify context information related to the contaminant in at least a partial area of the transparent member corresponding to the fingerprint sensor through the fingerprint sensor of the electronic device.

In operation 1820, the processor may acquire biometric information through at least the portion of the transparent member corresponding to the fingerprint sensor through the fingerprint sensor of the electronic device. For example, the processor may acquire information on the fingerprint of the user of the electronic device.

In operation 1830, the processor may recognize biometric information on the basis of the previously identified context information. For example, the processor may recognize biometric information through a process of comparing the acquired fingerprint information with fingerprint information pre-stored in the memory of the electronic device.

According to an embodiment, the processor may determine whether at least the portion of the transparent member corresponding to the fingerprint sensor is contaminated on the basis of the identified context information. When it is determined that the contaminant in at least the portion of the transparent member can be eliminated, the processor may output an elimination guide corresponding to the identified context information through the display of the electronic device. On the other hand, when it is determined that the contaminant in at least the portion of the transparent member cannot be eliminated, the processor may output content related to another authentication means that is not influenced by the contaminant in at least the portion of the transparent member on the basis of the identified context information.

According to an embodiment, when the contaminant is included in the acquired image, the electronic device may eliminate the contaminant and perform user authentication using the image from which the contaminant is eliminated. The image from which the contaminant is eliminated may be used for adaptive learning. For example, the image from which the contaminant is eliminated may be used as a registered fingerprint template. The processor may continuously monitor the use frequency or matching accuracy of the registered fingerprint template in a process of authenticating the user, which is performed after the fingerprint template is registered. When it is determined that matching accuracy of a fingerprint image newly acquired during the process of authenticating the user is higher than the registered and stored fingerprint template on the basis of the result of continuous monitoring, the processor may replace the fingerprint template with the newly acquired fingerprint image or update the registered or stored fingerprint template.

Further, the electronic device may determine the degree of distortion that may be generated in the acquired fingerprint image when the contaminant is eliminated on the basis of the size or characteristics of an area corresponding to the contaminant included in the acquired image. When it is determined that the determined degree of distortion is equal to or smaller than a preset threshold value, the processor may use the acquired image for adaptive learning. Images that can be used for adaptive learning are fingerprint template candidates that can be registered as fingerprint templates and may be stored in the electronic device. When it is determined that the matching accuracy of the fingerprint template candidate is higher than the registered and stored fingerprint template, the processor may register the fingerprint template candidate as the fingerprint template. In connection with registration of the fingerprint template candidate as the fingerprint template, the processor may provide feedback content in order to receive confirmation from the user of the electronic device. The fingerprint template candidate has a relatively higher possibility of distorting the result of user authentication compared to the formally registered and stored fingerprint template, and thus the processor may set a flag for the fingerprint template candidate. The processor may determine whether the result of user authentication generates distortion by continuously monitoring the fingerprint template candidate for which the flag is set.

Further, the electronic device may update a newly registered and stored fingerprint template on the basis of at least some of the previously registered and stored fingerprint templates. When it is determined that a number of pixels corresponding to a threshold value or more are changed during the process of processing the contaminant included in a newly acquired image even though the registered and stored fingerprint matches the newly acquired image on the basis of the result of user authentication, the electronic device may not use the newly acquired image for updating the registered and stored fingerprint template.

According to various embodiments of the disclosure, a method of acquiring biometric information through an electronic device including a housing, a transparent member configured to form at least a portion of the external surface of the electronic device and disposed in at least a portion of the housing, a display 160, at least a portion of which is housed in the housing and which is disposed in at least a partial area of the transparent member, a fingerprint sensor formed in at least a partial area of the display, and a processor connected to the display and to the fingerprint sensor may include an operation of identifying context information associated with a contaminant in at least a partial area of a transparent member corresponding to the fingerprint sensor through the fingerprint sensor, an operation of acquiring biometric information through at least the partial area of the transparent member corresponding to the fingerprint sensor through the fingerprint sensor, and an operation of configuring the electronic device to recognize the biometric information based on the context information.

The method of acquiring the image through the electronic device according to various embodiments of the disclosure may further include an operation of acquiring an image of at least the partial area of the transparent member corresponding to the fingerprint sensor through the fingerprint sensor, and the acquired image may include a first image captured before a fingerprint is input into the fingerprint sensor, a second image captured while a fingerprint is being input into the fingerprint sensor, and a third image captured after a fingerprint is input into the fingerprint sensor.

The method of acquiring the image through the electronic device according to various embodiments of the disclosure may further include an operation of identifying the contaminant in at least the partial area of the transparent member included in at least one of the first image and the third image and an operation of modifying a fingerprint image included in the second image based on the identified contaminant.

The method of acquiring the image through the electronic device according to various embodiments of the disclosure may further include an operation of performing authentication for the modified fingerprint image by comparing the modified fingerprint image with at least one fingerprint image pre-stored in a memory of the electronic device.

The method of acquiring the image through the electronic device according to various embodiments of the disclosure may further include an operation of receiving a signal related to a detection mode of the fingerprint sensor and an operation of determining at least one of an operation time of the fingerprint sensor and an image acquisition speed of the fingerprint sensor on the basis of the received signal.

The method of acquiring the image through the electronic device according to various embodiments of the disclosure may further include an operation of dividing the acquired image into a plurality of pixels, an operation of calculating a spatial average value of the acquired image using the plurality of pixels resulting from the division, an operation of detecting contaminated pixels among the plurality of pixels resulting from division based on the calculated spatial average value, and an operation of identifying the at least one contaminant through the detected pixels.

The method of acquiring the image through the electronic device according to various embodiments of the disclosure may further include an operation of acquiring a plurality of images of at least the partial area of the transparent member corresponding to the fingerprint sensor through the fingerprint sensor, an operation of dividing each of the plurality of acquired images into a plurality of pixels, an operation of calculating a change in each of the plurality of pixels resulting from division according to time, an operation of detecting contaminated pixels among the plurality of pixels resulting from division based on the calculated change, and an operation of identifying the at least one contaminant through the detected pixels.

The method of acquiring the image through the electronic device according to various embodiments of the disclosure may further include an operation of acquiring a plurality of images of at least the partial area of the transparent member corresponding to the fingerprint sensor through the fingerprint sensor, an operation of selecting a first image and a second image successively acquired among the plurality of acquired images, an operation of acquiring a differential image based on the selected first image and second image, and an operation of identifying the at least one contaminant included in the first image and the second image based on the acquired differential image.

The method of acquiring the image through the electronic device according to various embodiments of the disclosure may further include an operation of acquiring a plurality of images of at least the partial area of the transparent member corresponding to the fingerprint sensor through the fingerprint sensor, an operation of converting each of the plurality of acquired images into a binary image, an operation of dividing each of the converted binary images into a plurality of pixels, an operation of identifying that an area corresponding to a white pixel among the plurality of pixels resulting from division is a masking pixel, and an operation of identifying at least one contaminant using the identified masking pixel.

The method of acquiring the image through the electronic device according to various embodiments of the disclosure may further include an operation of determining whether the contaminant in at least the partial area of the transparent cover can be eliminated on the basis of the identified context information, an operation of, when it is determined that the contaminant in at least the partial area of the transparent cover can be eliminated, outputting an elimination guide corresponding to the identified context information through the display, and an operation of, when it is determined that the contaminant in at least the partial area of the transparent cover cannot be eliminated, outputting content related to another authentication means that is not influenced by the contaminant in at least the partial area of the transparent cover on the basis of the identified context information.

A computer-readable recording medium having a program recorded therein to perform a method of acquiring biometric information through an electronic device including a fingerprint sensor is provided. The method includes an operation of identifying context information associated with a contaminant in at least a partial area of a transparent member corresponding to the fingerprint sensor through the fingerprint sensor, an operation of acquiring biometric information through at least the partial area of the transparent member corresponding to the fingerprint sensor through the fingerprint sensor, and an operation of configuring the electronic device to recognize the biometric information based on the context information.

Each of the above-described component elements of hardware according to the disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction.

The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Various embodiments disclosed herein are provided merely to easily describe technical details of the disclosure and to help the understanding of the disclosure, and are not intended to limit the scope of the disclosure. Therefore, it should be construed that all modifications and changes or modified and changed forms based on the technical idea of the disclosure fall within the scope of the disclosure.

The invention claimed is:

1. An electronic device comprising:
   a housing;
   a transparent member;
   a display, at least a portion of which is housed in the housing, and which is disposed below at least a partial area of the transparent member;
   a fingerprint sensor disposed below the at least the partial area of the transparent member;
   a memory configured to store reference patterns corresponding to repetitive patterns extracted from pixels included in at least one fingerprint image; and
   a processor connected to the display, the fingerprint sensor, and the memory,
   wherein the processor is configured to:
      obtain a plurality of images, via the at least the partial area of the transparent member corresponding to the fingerprint sensor by using the fingerprint sensor, wherein the plurality of images include a first image captured while a fingerprint is not input into the fingerprint sensor and a second image captured while the fingerprint is input into the fingerprint sensor,
      identify a lost part of the second image by using the first image and the second image,
      obtain a fingerprint image based on the second image by compensating the lost part with at least portion of a reference pattern, the reference pattern being selected from among reference patterns, and
      perform authentication for the obtained fingerprint image.

2. The electronic device of claim 1,
   wherein the first image is captured before the second image is captured.

3. The electronic device of claim 1, wherein the processor is configured to:
   receive a signal related to a detection mode of the fingerprint sensor, and
   determine at least one of an operation time point of the fingerprint sensor and an image acquisition speed of the fingerprint sensor based on the received signal.

4. The electronic device of claim 1, wherein the processor is configured to: identify the lost part based on a differential image obtained by using the first image and the second image.

5. The electronic device of claim 1, wherein the reference patterns are identified based on a number of extraction of a pixel pattern included in the at least one fingerprint image.

6. A method of obtaining biometric information through an electronic device comprising a fingerprint sensor, the method comprising:
   obtaining a plurality of images, via the at least a partial area of a transparent member corresponding to the fingerprint sensor by using the fingerprint sensor, wherein the plurality of images include a first image captured while a fingerprint is not input into the fingerprint sensor and a second image captured while the fingerprint is input into the fingerprint sensor;
   identifying a lost part of the second image by using the first image and the second image;
   obtaining a fingerprint image based on the second image by compensating the lost part with at least portion of a reference pattern, the reference pattern being selected from among reference patterns stored in a memory, and the reference patterns corresponding to repetitive patterns extracted from pixels included in at least one fingerprint image; and
   performing authentication for the obtained fingerprint image.

7. The method of claim 6, wherein the first image is captured before the second image is captured.

8. The method of claim 6, further comprising identifying the lost part based on a differential image obtained by using the first image and the second image.

9. The method of claim 6, wherein the reference patterns are identified based on a number of extraction of a pixel pattern included in the at least one fingerprint image.

* * * * *